United States Patent
Zhou et al.

(10) Patent No.: US 8,793,396 B2
(45) Date of Patent: Jul. 29, 2014

(54) METHOD FOR DELETING SESSION INFORMATION IN DRA

(75) Inventors: Xiaoyun Zhou, Shenzhen (CN); Zaifeng Zong, Shenzhen (CN); Tong Rui, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 843 days.

(21) Appl. No.: 13/057,393

(22) PCT Filed: Dec. 16, 2008

(86) PCT No.: PCT/CN2008/073536
§ 371 (c)(1),
(2), (4) Date: Feb. 3, 2011

(87) PCT Pub. No.: WO2010/015133
PCT Pub. Date: Feb. 11, 2010

(65) Prior Publication Data
US 2011/0138005 A1    Jun. 9, 2011

(30) Foreign Application Priority Data

Aug. 7, 2008 (CN) .......................... 2008 1 0142285

(51) Int. Cl.
*G06F 15/173* (2006.01)
*H04L 12/56* (2006.01)
(52) U.S. Cl.
CPC ................. *H04L 45/02* (2013.01); *H04L 45/00* (2013.01)
USPC .......................................... 709/238; 709/230

(58) Field of Classification Search
CPC ......... H04L 45/00; H04L 45/02; H04L 12/14; H04W 84/042
USPC ......................................................... 709/238
See application file for complete search history.

(56) References Cited

FOREIGN PATENT DOCUMENTS

CN            101217383 A  *  7/2008

OTHER PUBLICATIONS

GSM et al. ("3rd Generation partnership project; Technical Specification Group Core Network and Terminals; Policy and Charging Control signalling flows and QoS parameter mapping; (Release 8)", 3GPP TS 29.213 V8.1.0 (Sep. 2008)).*

* cited by examiner

*Primary Examiner* — Dustin Nguyen
*Assistant Examiner* — Joel Mesa
(74) *Attorney, Agent, or Firm* — Brian J. Colandreo; Jeffrey T. Placker; Holland & Knight LLP

(57) ABSTRACT

The present invention discloses a method for deleting session information in Diameter Routing Agent, this method comprises: sending a request message for deleting the Diameter session to a visited Diameter Routing Agent DRA and a visited policy and charging rules function PCRF by a policy and charging control client; after the visited DRA receives the request message, the visited DRA marking the Diameter session as termination in the visited DRA; after the visited PCRF receives the request message, the visited PCRF sending a message requesting to delete the Diameter session information to a home DRA, the home DRA marking the Diameter session in the home DRA as termination. In the present invention, the session information in the DRA may be effectively deleted when the BBERF entity, the PCEF entity or the AF entity terminates the Diameter session between the local and the PCRF entities.

18 Claims, 11 Drawing Sheets

METHOD FOR DELETING SESSION INFORMATION IN DRA

FIELD OF THE INVENTION

The present invention relates to a method for deleting session information in DRA, and in particular to a method for deleting the session information in the DRA based on an Evolved Packet System ("EPS" for short) under a roaming scene.

BACKGROUND OF THE INVENTION

The EPS of the $3^{rd}$ Generation Partnership Project ("3GPP" for short) is constituted by an Evolved Universal Terrestrial Radio Access Network ("E-UTRAN" for short), a Mobility Management Entity ("MME" for short), a Serving Gateway ("S-GW" for short), a Packet Data Network Gate-Way ("P-GW" for short), a Home Subscriber Server ("HSS" for short), a 3GPP AAA server (3GPP Authorization/Authentication/Accounting server), a Policy and Charging Rules Function ("PCRF" for short) and other supporting nodes, wherein the S-GW is an access gateway equipment connected with the E-UTRAN for forwarding data between the E-UTRAN and the P-GW and responsible for buffering paging waiting data; the P-GW is a boarder gateway between the EPS and a Packet Data Network ("PDN" for short) and is responsible for the access of the PDN and for forwarding data between the EPS and the PDN, etc.; the PCRF obtains service information via a Rx interface and a operator Internet Protocol ("IP" for short) service network interface, and is connected with the gateway equipment in the network via a Gx/Gxa/Gxc interface, is responsible for initiating establishment of an IP bearer, ensures Quality of Service ("QoS" for short) of the service data, and controls the charging.

The EPS supports the interworking with a non-3GPP network. The interworking between the EPS and the non-3GPP network is realized via an S2a/b/c interface. The P-GW is used as an anchor point between the 3GPP network and the non-3GPP network. The non-3GPP network comprises: trusted non-3GPP network and untrusted non-3GPP network, wherein the IP access of the trusted non-3GPP network may be directly interfaced with P-GW via the S2a; and the IP access of the untrusted non-3GPP network needs be connected with the P-GW through an Evolved Packet Data Gateway ("ePDG" for short) with the S2b as the interface between the ePDG and the P-GW.

In the 3GPP network between the EPSs, a Policy and charging enforcement function ("PCEF" for short) exists in the P-GW. All functions can be controlled as long as the PCRF is connected with the P-GW. The PCRF exchanges information with the P-GW via the Gx interface. When the interface between the P-GW and the S-GW is based on Proxy Mobile IP ("PMIP" for short), a Bearer Binding and Event Report Function ("BBERF" for short) is present in the S-GW, and the S-GW exchanges information with the PCRF via the Gxc interface. When the trusted non-3GPP network accesses, the BBERF resides in the trusted non-3GPP access gateway, and the trusted non-3GPP network access gateway exchanges information with the PCRF via the Gxa interface. When a User Equipment ("UE" for short) roams, an S9 interface acts as the interface between a home PCRF and a visited PCRF, meanwhile, an Application Function ("AF" for short) providing service for the UE sends service information which is used to generate Policy and Charging Control ("PCC" for short) policy to the PCRF via a Rx+ interface.

A plurality of PCRF nodes exist in one Public Land Mobile Network ("PLMN" for short) of the EPS, and all the PCRF nodes belong to one or more Diameter domains (i.e., PCRF domain), and all the PCRFs in a same Diameter domain (i.e., PCRF domain) have same capacity. The connection of one UE to the PDN network is called as one IP Connectivity Access Network ("IP-CAN" for short) session. The PCC policy of one IP-CAN session is merely decided by one PCRF. In order to ensure all the PCEFs or BBERFs related to one IP-CAN session and the AFs which provide service for this IP-CAN session are all associated with the same PCRF, the EPS introduces one logical function means, i.e., Diameter Routing Agent ("DRA" for short), into each Diameter (PCRF) domain.

When the UE is to establish the IP-CAN session to one PDN, one PCRF is selected by the DRA for this IP-CAN session, the PCEFs, the BBERFs and the AFs related to this IP-CAN session are associated to the selected PCRF through the DRA. The PCEF, BBERF and AF establish the Diameter sessions with the selected PCRF, respectively, and the policy and service information, etc. for controlling the IP-CAN session are transmitted via these Diameter sessions. In order to ensure that the DRA associates the PCEF, BBERF and AF with one PCRF correctly, the DRA should save the related information capable of uniquely identifying this IP-CAN session and corresponding PCRF identifier or IP address, the information identifying the IP-CAN session includes the Network Address Identity ("NAI" for short) of the UE, the IP address of the UE, the Access Point Name ("APN" for short) through which the UE accesses the PDN, and so on. When the PCEF, the BBERF and the AF of the same IP-CAN session establish the Diameter sessions with the PCRF, the information is provided to the DRA, and the DRA may select the same PCRF for it by searching for the saved information. The information of the Diameter session established by the PCEF, the BBERF or the AF and the PCRF, for instance, the session identity of the established Diameter session, and so on, may be saved in the DRA, thus the DRA can know the Diameter session it manages for the IP-CAN session. The DRA may also select the same PCRF for all the IP-CAN sessions of the UE. When the Diameter session established by the PCEF, the BBERF or the AF and the PCRF is deleted, the PCEF, the BBERF or the AF will notify the DRA that this Diameter is deleted, and the DRA may delete the information (e.g. session identifier) of this Diameter session. When all the Diameter sessions managed by the DRA for a certain IP-CAN session are deleted, the DRA will delete all the information of this IP-CAN session. When the DRA selects a same PCRF for all the IP-CAN sessions of the UE, the DRA will delete all the information of this IP-CAN session after all the Diameter sessions managed by the DRA for this UE are deleted.

Currently, the EPS has three types of roaming architectures. The first type is home routed. FIG. 1 is a roaming architecture view of the home routed of the EPS. As shown in FIG. 1, the P-GW is in the home network, and is provided with IP service by a home network operator (i.e., the AF is in the home network). The second type is local breakout and the IP service is provided by the home network operator. FIG. 2 is a roaming architecture view of the local breakout and the home network operator providing the IP service. As shown in FIG. 2, the P-GW is in a visited network and is provided with the IP service by the home network operator (i.e., the AF is in the home network). The third type is the local breakout and the IP service is provided by a visited network operator. FIG. 3 is a roaming architecture view of the local breakout and the visited network operator providing the IP service. As shown in FIG. 3, the P-GW is in the visited network, and is provided with the IP service by the visited network operator (i.e., the AF is in the visited network).

The DRA can be realized specifically in the following three modes: (1) a Redirect mode, wherein when the PCEF, the BBERF and the AF send a Diameter session establish request message to the PCRF, this message is firstly sent to the DRA. If the DRA has not had any information related to this IP-CAN session yet, the DRA will select one PCRF for this IP-CAN session and feeds back the identifier or address of the selected PCRF to the sender; if the DRA has already had the information related to this IP-CAN session, the DRA feeds back the identifier or address of the corresponding PCRF to the sender. The sender sends the Diameter session establish request message to the selected PCRF after the sender obtains the address or the identifier of the PCRF; (2) a Proxy mode, wherein when the PCEF, the BBERF and the AF send the Diameter session establish request message to the PCRF, this message is firstly sent to the DRA. If the DRA does not have any information related to this IP-CAN session, the DRA selects one PCRF for this IP-CAN session and forwards the message related to this IP-CAN session to the selected PCRF; if DRA has already had the information related to this IP-CAN session, the DRA forwards the message related to this IP-CAN session to a corresponding PCRF, and the acknowledgement message of the PCRF is also forwarded to the PCEF, the BBERF or the AF via the DRA; and (3) a modification of the Proxy mode which is similar to the Proxy mode and different at: the DRA will also send the address of the PCRF to the PCEF, the BBERF or the AF when the DRA forwards an acknowledgement message fed back by the PCRF. Thereby, in subsequent message interacting, the PCEF, the BBERF or the AF can interwork directly with the PCRF without passing through the DRA.

Regarding the above mode (2), no matter it is the session establish message in the first place or the subsequent messages, they all pass through the DRA, thus, when the Diameter session is to be terminated, the DRA may analyze and obtain the indication for terminating the session carried in the message so as to delete the information of this session in the DRA. Regarding the above mode (3), when the Diameter session is to be terminated, it can be realized merely by that firstly a client sends a termination message to the DRA and then the DRA forwards the same to the PCEF. Regarding the mode (1), a problem yet to be solved is how the client deletes the information related to the session in the DRA when terminating the Diameter session with the PCRF, especially under the roaming scene. There is still no good solution at present for deleting the related information saved in the DRA when one Diameter session is terminated.

SUMMARY OF THE INVENTION

The present invention is proposed considering the above problem existing in the mode (1) that the client cannot delete the session-related information in the DRA while terminating the Diameter session with the PCRF. The object of the present invention is to provide a method for deleting session information in DRA under a roaming scene so as to solve the above problem.

According to one aspect of the present invention, a method for deleting session information in the DRA is provided. This method is adapted to the Evolved Packet System under the roaming scene, comprising the following operations:

sending a request message for deleting a Diameter session to a visited Diameter Routing Agent DRA and a visited Policy and Charging Rules Function PCRF by a policy and charging control client;

marking the Diameter session in the visited DRA as termination by the visited DRA after the visited DRA receives the request message;

sending a message to a home DRA by the visited PCRF, after the visited PCRF receives the request message, to request to delete information of the Diameter session, and marking the Diameter session in the home DRA as termination by the home DRA.

Wherein for the situation of sending the request message for deleting the Diameter session to the visited DRA by the policy and charging control client, the request message carries a first session identifier allocated by the policy and charging control client during the session establishment procedure; the visited DRA marks the Diameter session as termination in the visited DRA according to the first session identifier.

For the situation of sending the request message for deleting the Diameter session to the visited PCRF by the policy and charging control client, the request message carries the first session identifier, the visited PCRF obtains a second session identifier corresponding to the Diameter session established between the visited PCRF and the home PCRF according to the first session identifier, as to sending a message to request to delete the Diameter session to the home DRA by the visited PCRF, the request message carries the second session identifier; the home DRA marks the Diameter session as termination in the home DRA according to the second session identifier; or the visited PCRF sends the message to request to delete the Diameter session to the home DRA, and the message carries the first session identifier and the second session identifier; the home DRA marks the Diameter session information in the home DRA according to the first session identifier and the second session identifier.

In the above method, if both visited DRA and home DRA are in the Redirect mode, sending the request message by the policy and charging control client comprises: sending the request message for deleting the Diameter session to the visited DRA by the policy and charging control client, after the visited DRA marks the Diameter session in the visited DRA as termination, the visited DRA returning returns a Redirect message to the policy and charging control client; after the policy and charging control client obtains the visited PCRF identifier or address information according to the Redirect message, the policy and charging control client sending the request message for deleting the Diameter session to the visited PCRF; sending the message by the visited PCRF comprises: sending the message to request to delete the Diameter session to the home DRA by the visited PCRF, after the home DRA marks the Diameter session in the home DRA as termination, returning the Redirect message to the visited PCRF; or sending the request message by the policy and charging control client comprises: sending the request message for deleting the Diameter session to the visited DRA and the visited PCRF simultaneously by the policy and charging control client; returning an acknowledgement message to the policy and charging control client by the visited DRA after the visited DRA marks the Diameter session in the visited DRA as termination, and sending the message by the visited PCRF comprises: sending the request message for deleting the Diameter session to the home DRA and the home PCRF simultaneously by the visited PCRF; returning the acknowledgement message to the visited PCRF by the home DRA after the home DRA marks the Diameter session in the home DRA as termination.

If the visited DRA is in the Redirect mode, and the home DRA is in the Proxy mode, sending the request message by the policy and charging control client comprises: sending the request message for deleting the Diameter session to the visited DRA by the policy and charging control client, returning a Redirect message to the policy and charging control client by the visited DRA after the visited DRA marks the Diameter session as termination; obtaining a visited PCRF identifier or address information according to the Redirect message and sending the request message for deleting the Diameter session to the visited PCRF by the policy and charging control client, and sending the message by the visited PCRF comprises: sending the message for requesting to delete the Diameter session to the home DRA by the visited PCRF, forwarding the message to the home PCRF by the home DRA; or sending the request message by the policy and charging control client comprises: sending the request message for deleting the Diameter session to the visited DRA and the visited PCRF simultaneously by the policy and charging control client; returning the acknowledgement message to the policy and charging control client by the visited DRA after the visited DRA marks the Diameter session as termination, and sending the message by the visited PCRF comprises: sending the message for requesting to deleting the Diameter session to the home DRA by the visited PCRF, and forwarding the message to the home PCRF by the home DRA.

If the visited DRA is in the Proxy mode, and the home DRA is in the Redirect mode, sending the request message by the policy and charging control client comprises: sending the request message for deleting the Diameter session to the visited DRA by the policy and charging control client, forwarding the request message to the visited PCRF by the visited DRA; sending the message by the visited PCRF comprises: sending the message requesting to delete the Diameter session to the home DRA by the visited PCRF, after the home DRA marking the Diameter session in the home DRA as termination, the home DRA returning the Redirect message to the visited PCRF; or sending the request message by the policy and charging control client comprises: sending the request message for deleting the Diameter session to the visited DRA by the policy and charging control client, forwarding the request message to the visited PCRF by the visited DRA; sending the message by the visited PCRF comprises: sending the message requesting to delete the Diameter session to the home DRA and the home PCRF simultaneously by the visited PCRF, after the home DRA marking the Diameter session in the home DRA as termination, the home DRA returning an acknowledgement message to the visited PCRF.

In the above method, wherein the policy and charging control client is one of a Bearing Binding and Event Report Function (BBERF) entity, a Policy and charging enforcement function (PCEF) entity and am Application Function (AF) entity.

In the above method, wherein if the policy and charging control client is the BBERF, the request message is a gateway control session termination indication message, and the Diameter session is a Gxx session.

In the above method, wherein if the policy and charging control client is the AF, the request message is an AF session termination request message, and the Diameter session is an Rx session.

In the above method, wherein if the policy and charging control client is the PCEF, the request message is an IP Connectivity Access Network, i.e., IP-CAN, session termination indication message, and the Diameter session is a Gx session.

In the above method, wherein after the visited DRA or the home DRA deletes the Diameter session information, if all the Diameter sessions belonging to an IP-CAN session or all the Diameter sessions of the UE in the visited DRA or the home DRA are deleted, the visited DRA or the home DRA deletes all information of the IP-CAN session or of the UE.

In the above method, sending the message to the home DRA comprises: sending the request message for deleting the Diameter session to the home DRA by the visited PCRF, after the visited PCRF receives the request message for deleting the Diameter session, when the visited PCRF determines the Diameter session to be deleted to be the last Diameter session corresponding to the S9 session between the visited PCRF and the home PCRF.

With at least one of the above technical solutions, by sending the request message for deleting the Diameter session to the visited Diameter Routing Agent and the visited Policy and Charging Rules Function by the policy and charging control client in the present invention, the session information in the DRA may be effectively deleted when the BBERF, the PCEF or the AF terminates the Diameter session between itself and the PCRF.

DETAILED DESCRIPTION OF EMBODIMENTS

Function Overview

In the technical solutions provided by the present invention, by sending the request message for deleting the Diameter session to the visited Diameter Routing Agent and the visited Policy and Charging Rules Function by the policy and charging control client, the session information in the DRA may be effectively deleted when the BBERF, the PCEF or the AF terminates the Diameter session between itself and the PCRF.

The method of the present invention will be further described hereinafter in detail in conjunction with the drawings thereof. It should be indicated that the embodiments and the features thereof in the present application may be combined if they are not conflicted.

The following scenes are taken into consideration in the embodiments: (1) both vDRA (visited DRA) and hDRA (home DRA) use the Redirect mode, such as in Embodiments 1, 2 and 3; (2) the vDRA uses the Redirect mode, and the hDRA uses the Proxy mode, such as in Embodiments 4, 5 and 6; and (3) the vDRA uses the Proxy mode, and the DRA uses the Redirect mode, such as in Embodiments 7, 8 and 9.

Embodiment 1

Figure 1:
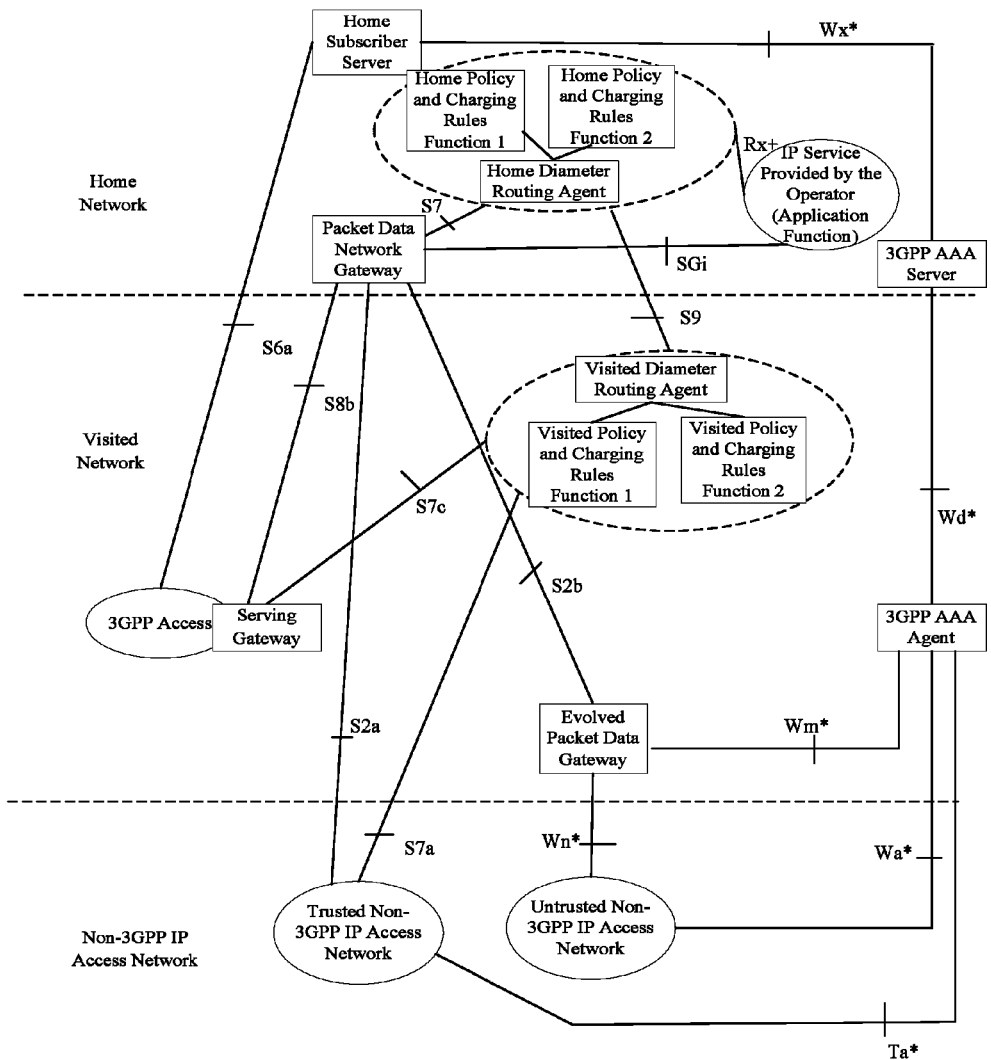
FIG. 1 is a roaming architecture view of the home routed of the EPS according to the related art.
Figure 2:
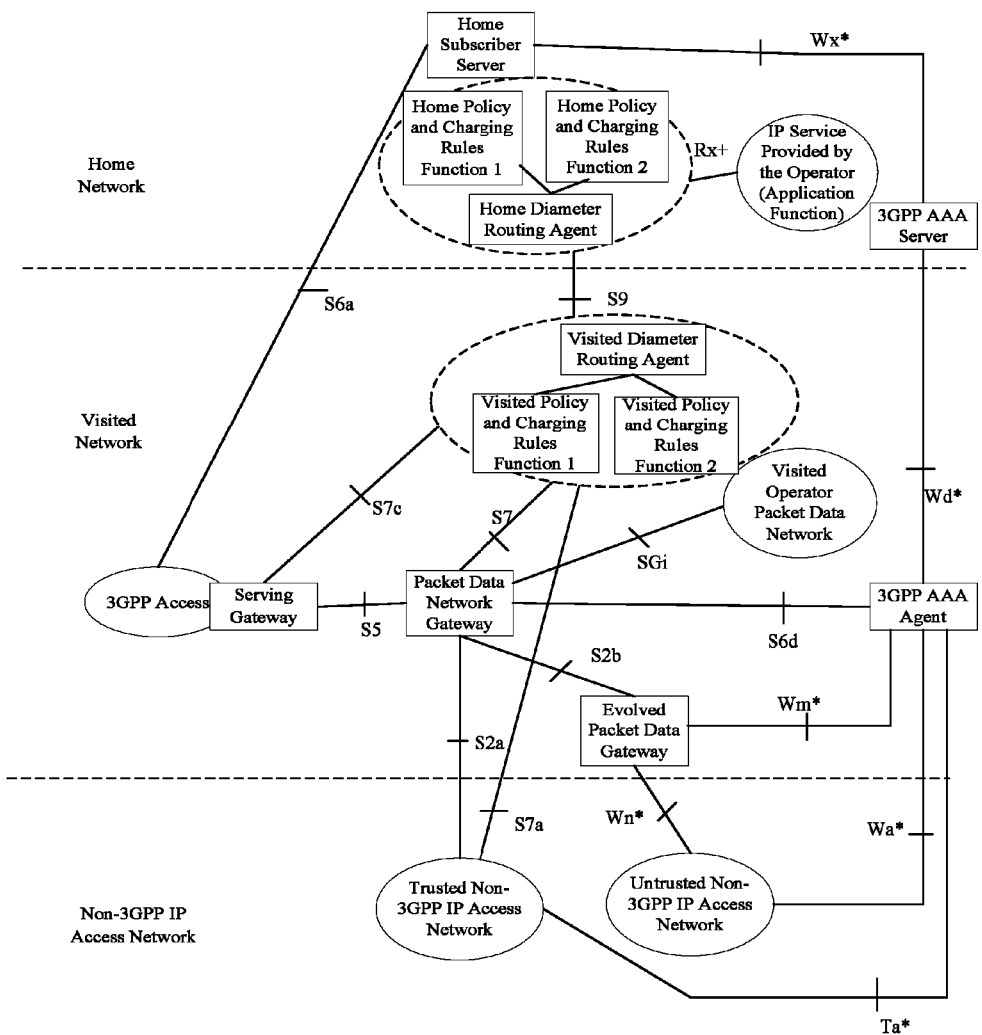
FIG. 2 is a roaming architecture view of the local breakout and the home network operator providing the IP service of the EPS according to the related art.
Figure 3:
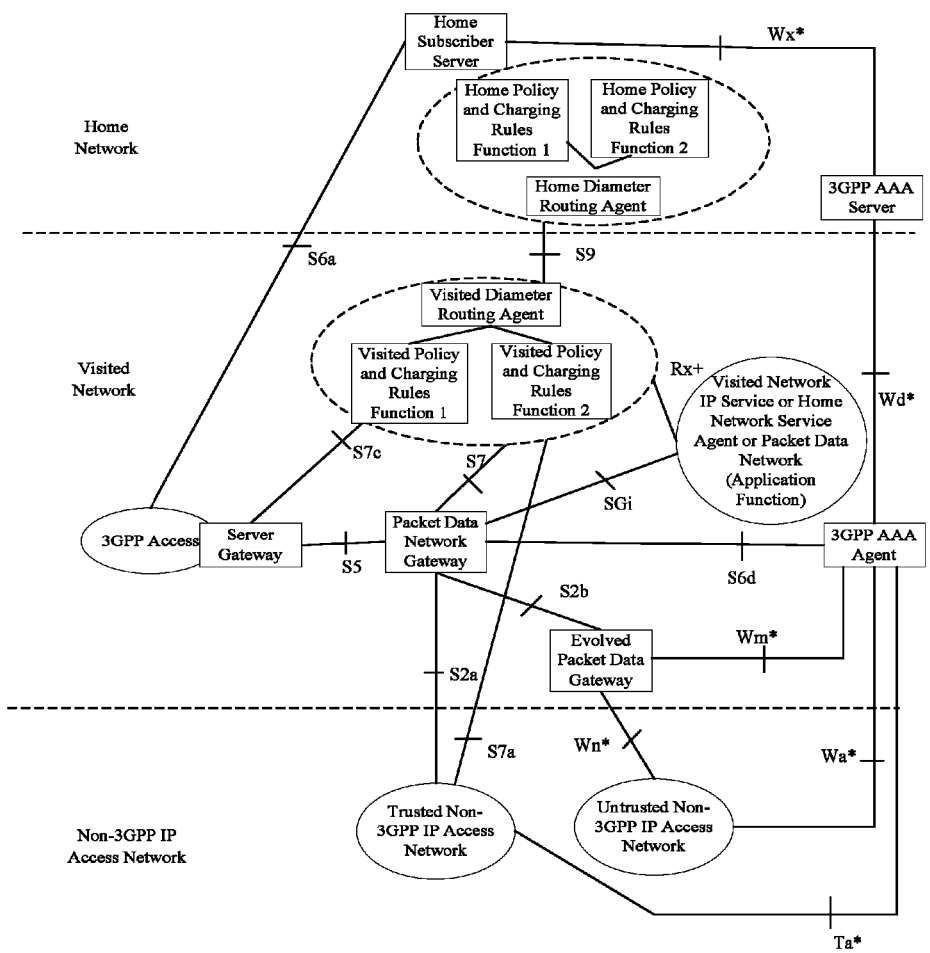
FIG. 3 is a roaming architecture view of the local breakout and the visited network provider providing the IP service of the EPS according to the related art.
Figure 4:
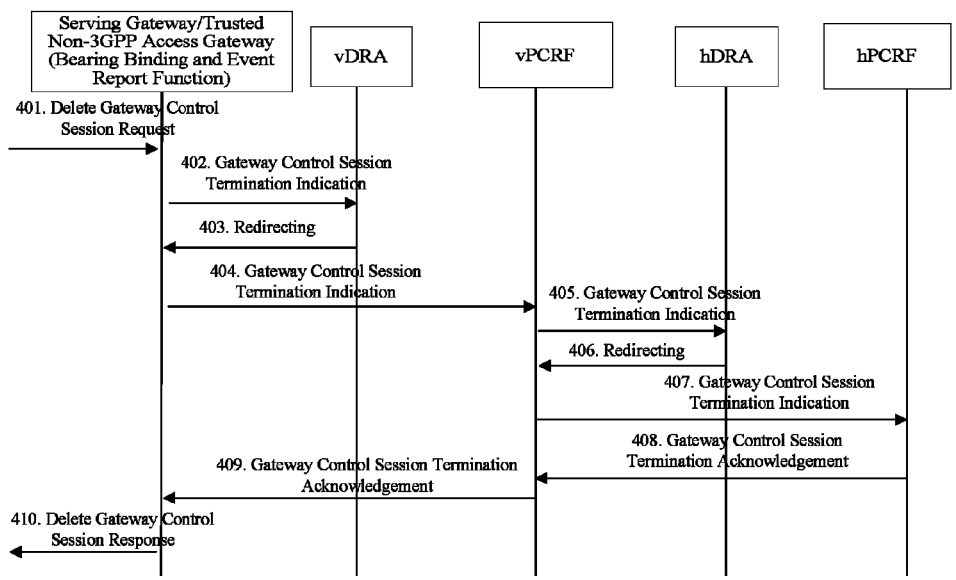
FIG. 4 is a flow chart of the gateway control session termination in Method Embodiment 1 of the present invention.

The present embodiment is the gateway control session termination flow result in the IP-CAN session termination when the UE detaches or the BBERF relocation and the BBERF described in the present embodiment is in the visited network (the UE is in the home routed case or the local breakout case), wherein both the DRAs in the visited and the home networks are in the Redirect mode. FIG. 4 is a flow chart of the gateway control session termination according to the present embodiment. As shown in FIG. 4, the following steps (step 401-step 410) are comprised.

Step 401: The BBERF residing in the S-GW or the trusted non-3GPP access gateway receives a delete gateway control session request message, wherein this message carries the NAI, the APN and the IP address of the UE.

Step 402: the BBERF may learn that the vDRA uses a realizing mode of the Redirect according to configuration information or the action of the vDRA obtained during a gateway control session establishment procedure. The BBERF obtains the context of the gateway control session (which may be called Gxx session) to be deleted according to the NAI, the APN or the IP address of the UE, wherein session identifier 1 is saved in the context, this identifier 1 is allocated by the BBERF for this Gxx session during the gateway control session establishment procedure, the base protocol of the Diameter ensures the session identifier 1 to be globally unique. The BBERF sends a gateway control session termination indication message to the vDRA, this message may be filled in with a destination address according to the address of the DRA obtained by configuration or the destination domain name according to the domain name of the home network derived from the NAI or the domain name of the visited network, meanwhile, this message carries the session identifier 1.

Step 403: after the vDRA deletes the information of the corresponding Gxx session in the vDRA according to the session identifier 1, the vDRA feeds back an acknowledgement message to the BBERF. Herein, there may be a plurality of realizing modes for deleting the information of the corresponding Gxx session in the vDRA, for instance, deleting the information of this Gxx session saved in the vDRA, or making a mark in the vDRA to indicate this Gxx session has been released. The specific deleting mode does not affect the implementation of the present invention. If in the vDRA, all the Diameter sessions of this IP-CAN session have been deleted or all the Diameter sessions of this UE have been deleted, the vDRA deletes all information of this IP-CAN session or of this UE.

Step 404: at the same time of sending the gateway control session termination indication message in the above step 402, the BBERF sends the gateway control session termination indication message to the vPCRF, wherein the destination address in this message is an identifier or an IP address of the vPCRF obtained during the gateway control session establishment procedure, and this message carries the session identifier 1.

A Redirect mechanism of the Diameter may also be used by the step 404, wherein after the identifier or the IP address of the vPCRF is obtained from the Redirect message received in the step 403, the gateway control session termination indication message is sent to the vPCRF.

Step 405: the vPCRF finds the corresponding context that it saves according to the session identifier 1 received, wherein it includes session identifier 2 corresponding to the Diameter session established between the vPCRF and the hPCRF. The vPCRF determines that the realizing mode of the hDRA is the Redirect according to the action of the hDRA during the gateway control session establishment procedure, and sends a message to the hDRA to notify the hDRA that the Gxx session of the session corresponding to the session identifier 2 is deleted, the destination domain name of this message is filled as the domain name of the home network derived from the NAI, meanwhile, this message carries the session identifier 2, and further, this message may also carry the session identifier 1.

Step 406: the hDRA feeds back the acknowledgement message to the vPCRF after the hDRA deletes the information of the corresponding Gxx session in the hDRA according to the session identifier 2 and/or the session identifier 1. Herein, the deletion can be realized in a plurality of modes, for instance, deleting the information of the Gxx session saved in the hDRA, or making a mark in the hDRA to indicate this Gxx session has been released. The specific deleting mode does not affect the implementation of the present invention. If in the hDRA, all the Diameter sessions of this IP-CAN session have been deleted or all the Diameter sessions of this UE have been deleted, the hDRA deletes all information of this IP-CAN session or of this UE.

Step 407: at the same time of sending the message in the step 405, the vPCRF sends the message to the hPCRF to notify the deletion of the Gxx session, wherein the destination address in this message is the identifier or the IP address of the hPCRF obtained during the session establishment procedure, and this message carries the session identifier 2. Further, this message may also carry the session identifier 1.

Step 408: the hPCRF deletes the information related to this Gxx session in the hPCRF according to the session identifier 2 and/or the session identifier 1, and the hPCRF feeds back a gateway control session termination acknowledgement message to the vPCRF.

The Redirect mechanism of the Diameter may also be used by the step 407, and after the identifier or the IP address of the hPCRF is obtained from the Redirect message received in the step 406, a message is sent to the hPCRF.

Step 409: the vPCRF deletes the information related to this Gxx session in the vPCRF after the vPCRF receives the acknowledgement message, and feeds back the gateway control session termination acknowledgement message to the BBERF. If in the vPCRF, all the Diameter sessions of this IP-CAN session have been deleted or all the Diameter sessions of this UE have been deleted, the vPCRF deletes all information of this IP-CAN session or of this UE.

Step 410: after the BBERF receives the acknowledgement message, the BBERF deletes the information related to the Gxx session in the BBERF, and feeds back a delete gateway control session response message.

Embodiment 2

Figure 5:
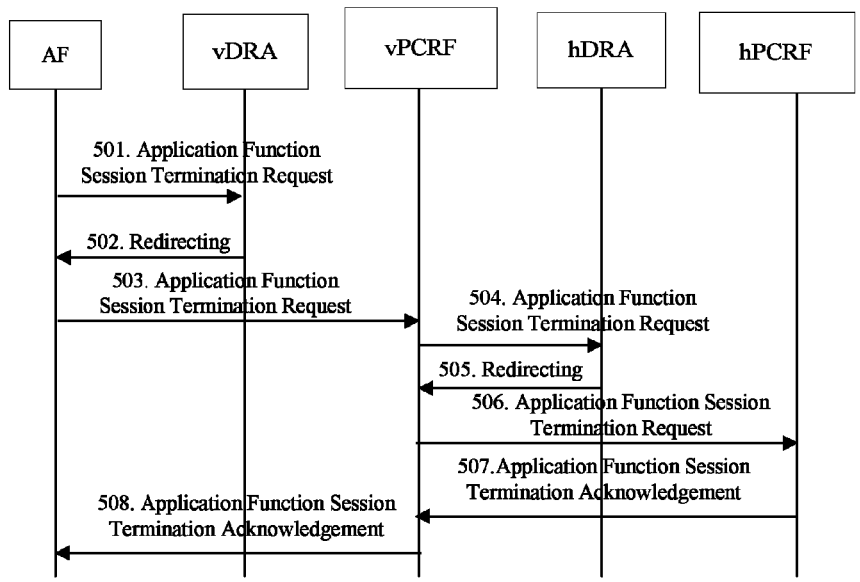
FIG. 5 is a flow chart of the AF session termination caused when the service is terminated in Method Embodiment 2 of the present invention.

The AF described in this embodiment is in the visited network (the UE is in the local breakout and the visited network operator providing the IP service). FIG. 5 is a flow chart of the AF session termination caused when the service is terminated according to the embodiment of the present invention. As shown in FIG. 5, the following steps (step 501-step 508) are comprised.

Step 501: the AF may learn that the vDRA uses a realizing mode of the Redirect according to configuration information or the action of the vDRA obtained during a gateway control session establishment procedure. The AF sends an AF session termination request message to the vDRA, this message can be filled in with the destination address according to the address of the DRA obtained by configuration or the destination domain name according to the domain name of the home network derived from the NAI or the domain name of the visited network, meanwhile, this message carries session identifier 1 which is allocated by the AF during an AF session establishment procedure. The AF session may also be called Rx session.

Step 502: the vDRA feeds back an acknowledgement message to the BBERF after the vDRA deletes the information of the corresponding Rx session in the vDRA according to the session identifier 1. Herein, there can be a plurality of realizing modes for deleting the information of the corresponding Rx session in the vDRA, for instance, deleting the information of this Rx session saved in the vDRA, or making a mark in the vDRA to indicate that this Rx session has been released. The specific deleting mode does not affect the implementation of the present invention. If in the vDRA, all the Diameter sessions of this IP-CAN session have been deleted or all the Diameter sessions of this UE have been deleted, the vDRA deletes all information of this IP-CAN session or of this UE.

Step 503: at the same time of sending the message in the step 501, the AF sends the AF session termination request message to the vPCRF, wherein the destination address in this message is an identifier or an IP address of the vPCRF obtained during the AF session establishment procedure, and this message carries the session identifier 1.

The Redirect mechanism of the Diameter may also be used by the step 503, wherein after the identifier or the IP address of the vPCRF is obtained from the Redirect message received in the step 502, the AF session termination request message is sent to the vPCRF.

Step 504: the vPCRF finds corresponding context saved by itself according to the session identifier 1 received, wherein the context includes session identifier 2 corresponding to the Diameter session established between the vPCRF and the hPCRF. The vPCRF determines that the realizing mode of the hDRA is the Redirect according to the action of the hDRA during the AF session establishment procedure, and sends the request message to the hDRA to notify that the Rx session of the session corresponding to the session identifier 2 is deleted, and the destination domain name filled into this message is the domain name of the home network derived from the NAI, meanwhile, this message carries the session identifier 2, and further, may also carry the session identifier 1.

Step 505: the hDRA feeds back a Redirect message to the vPCRF after the hDRA deletes the information of the corresponding AF session in the hDRA according to the session identifier 2 and/or the session identifier 1. Herein, there can be a plurality of realizing modes for deleting the information of the corresponding AF session, for instance, deleting the information of this Rx session saved in the hDRA, or making a mark in the hDRA to indicate this Rx session has been released. The specific deleting mode does not affect the implementation of the present invention. If in the hDRA, all the Diameter sessions of this IP-CAN session have been deleted or all the Diameter sessions of this UE have been deleted, the hDRA deletes all information of this IP-CAN session or of this UE.

Step 506: at the same time of sending the message in the step 504, the vPCRF sends the request message to the hPCRF to notify that the Rx session is deleted, wherein the destination address in this message is the identifier or the IP address of the hPCRF obtained during the AF session establishment procedure, and this message carries the session identifier 2, and further, may also carry the session identifier 1.

Step 507: the hPCRF deletes the information related to this AF according to the session identifier 2 and/or the session identifier 1, and feeds back the AF session termination acknowledgement message to the vPCRF by the hPCRF.

The Redirect mechanism of the Diameter may also be used by the step 506, wherein after the identifier or the IP address of the hPCRF is obtained from the Redirect message received in the step 505, the request message is sent to the hPCRF.

Step 508: after the vPCRF receives the acknowledgement message, the vPCRF deletes the information related to the Rx session, and feeds back an AF session termination acknowledgement to the AF. If in the vPCRF, all the Diameter sessions of this IP-CAN session have been deleted or all the Diameter sessions of this UE have been deleted, the vPCRF deletes all information of this IP-CAN session or of this UE.

Embodiment 3

Figure 6:
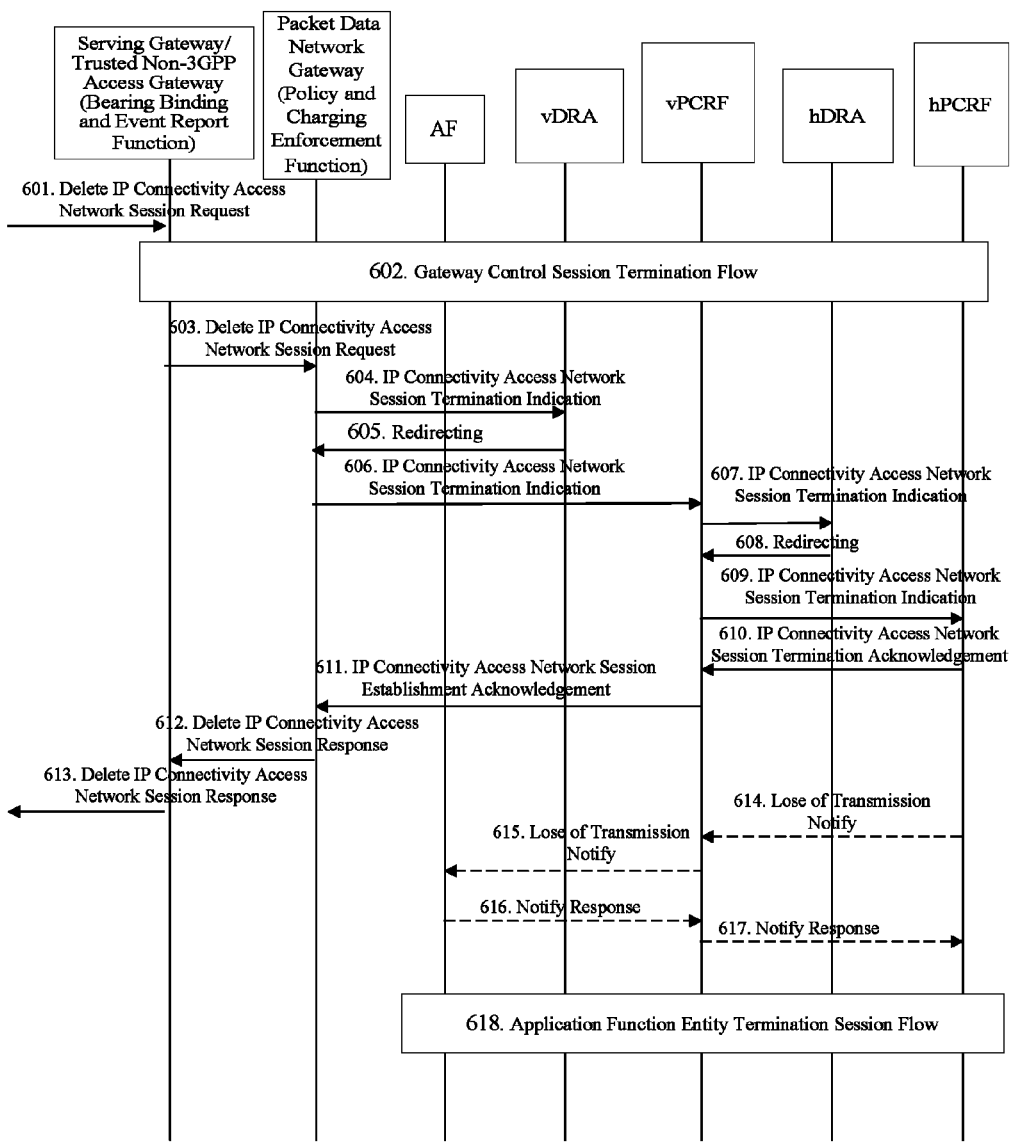
FIG. 6 is a flow chart of the IP-CAN session termination caused by the detachment initiated by the UE in Method Embodiment 3 of the present invention.

In the present embodiment, it is described a flow of the IP-CAN session termination caused by the detachment initiated by a UE after the UE accesses the 3GPP system through the E-UTRAN, the trusted non-3GPP network or the untrusted non-3GPP network, wherein the UE uses the roaming architecture of the local breakout and the visited network operator providing the IP service. FIG. 6 is a flow chart of the IP-CAN session termination caused by the detachment initiated by the UE, and as shown in FIG. 6, the following steps (step 601-step 611) are comprised.

Step 601: the BBERF residing in the S-GW or the trusted non-3GPP access gateway receives a delete IP-CAN session request message, wherein this message carries the NAI, the APN and the IP address of the UE.

Step 602: the BBERF initiates the flow of the gateway control session termination, same as in the step 402 of Embodiment 1.

Step 603: the BBERF sends the delete IP-CAN session request message to the PCEF, wherein this message carries the NAI, the APN and the IP address of the UE.

Step 604: the PCEF finds corresponding context saved by itself according to the NAI, the APN and the IP address of the UE, wherein the context includes the session identifier 1 of the Diameter session established between the PCEF and the vPCRF. This Diameter session may also be called Gx session.

The PCEF may learns that the vDRA uses the realizing mode of the Redirect according to configuration information or the action of the vDRA obtained during the IP-CAN session establishment procedure. The PCEF sends the IP-CAN session termination indication message to the vDRA, and this message may be filled in with the destination address according to the address of the vDRA obtained by configuration or the destination domain name according to the domain name of the home network derived from the NAI or the domain name of the visited network, meanwhile, this message carries the session identifier 1.

Step 605: after the vDRA deletes the information of the corresponding Gx session in the vDRA according to the session identifier 1, the vDRA feeds back an acknowledgement message to the PCEF. Herein, the deletion can be realized in a plurality of modes, for instance, deleting the information of this Gx session saved in the vDRA, or making a mark in the vDRA to indicate that this Gx session has been released. The specific deleting mode does not affect the implementation of the present invention. If in the vDRA, all the Diameter sessions of this IP-CAN session have been deleted, the vDRA deletes all information of this IP-CAN session.

Step 606: at the same time of sending the message in the step 604, the PCEF sends an IP-CAN session termination indication message to the vPCRF, wherein the destination address in this message is an identifier or an IP address of the vPCRF obtained during the IP-CAN session establishment procedure, and this message carries the session identifier 1.

The Redirect mechanism of the Diameter may also be used by the step 606, wherein after the identifier or the IP address of the vPCRF is obtained from the Redirect message received in the step 605, the IP-CAN session termination indication message is sent to the vPCRF.

Step 607: the vPCRF finds corresponding context saved by itself according to the session identifier 1 received, wherein the context includes session identifier 2 corresponding to the Diameter session established between the vPCRF and the hPCRF. The vPCRF may learn that the vDRA uses the realizing mode of the Redirect according to the action of the vDRA obtained during the IP-CAN session establishment procedure. The vPCRF sends a message to the hDRA to notify the hDRA that the Gx session of the session corresponding to the session identifier 2 is deleted, the destination domain name in this message is the domain name of the home network obtained derived from the NAI, the session identifier 2 is carried, and further, this message may also carry the session identifier 1.

Step 608: after the hDRA deletes the information of the corresponding Gx session in the hDRA according to the session identifier 2 and/or the session identifier 1, the hDRA feeds back an acknowledgement message to the vPCRF. Herein, the deletion can be realized in a plurality of modes, for instance, deleting the information of this Gx session saved in the hDRA, or making a mark in the hDRA to indicate that this Gx session has been released. The specific deleting mode does not affect the implementation of the present invention. If in the hDRA, all the Diameter sessions of this IP-CAN session have been deleted or all the Diameter sessions of this UE have been deleted, the hDRA deletes all information of this IP-CAN session or of this UE.

Step 609: at the same time of sending the message in the step 607, the vPCRF sends the IP-CAN session termination indication message to the hPCRF, wherein the destination address in this message is the identifier or the IP address of the hPCRF obtained during the IP-CAN session establishment procedure, and this message carries the session identifier 2, and further, may also carry the session identifier 1.

Step 610: the hPCRF deletes the information related to this Gx according to the session identifier 2 and/or the session identifier 1, and feeds back an IP-CAN session termination acknowledgement message to the vPCRF.

The Redirect mechanism of the Diameter may also be used by the step 609, wherein after the identifier or the IP address of the hPCRF is obtained from the Redirect message received in the step 608, the IP-CAN session termination indication message is sent to the hPCRF.

Step 611: after the vPCRF receives the acknowledgement message, the vPCRF deletes the information related to the Gx, and feeds back the IP-CAN session termination acknowledgement to the PCEF. If in the vPCRF, all the Diameter sessions of this IP-CAN session have been deleted or all the Diameter sessions of this UE have been deleted, the vPCRF deletes all information of this IP-CAN session or of this UE.

Embodiment 4

Figure 7:
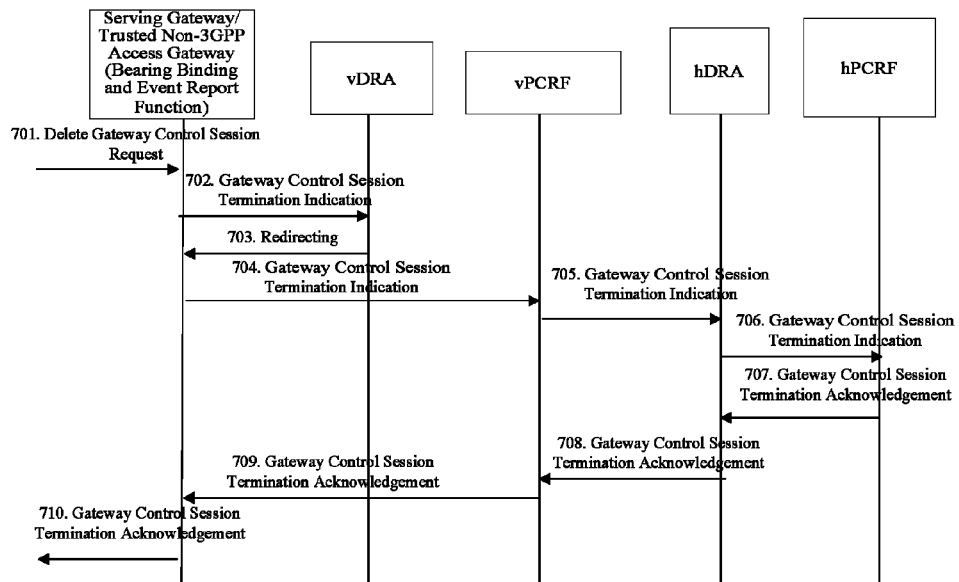
FIG. 7 is a flow chart of the gateway control session termination in Method Embodiment 4 of the present invention.

The present embodiment is the gateway control session termination flow result in the IP-CAN session termination when the UE detaches or the BBERF relocation and the BBERF described in the present embodiment is in the visited network (the UE is in the home routed case or the local breakout case), wherein the visited DRA is in the Redirect mode, and the home network DRA is in the Proxy mode. FIG. 7 is a flow chart of the gateway control session termination, and as shown in FIG. 7, the following steps (step 701-step 710) are comprised.

Step 701: the BBERF residing in the S-GW or the trusted non-3GPP access gateway receives a delete gateway control session request message, wherein this message carries the NAI, the APN and the IP address of the UE.

Step 702: the BBERF may learns that the vDRA uses the realizing mode of the Redirect according to configuration information or the action of the vDRA obtained during a gateway control session establishment procedure. The BBERF searches for the context of the gateway control session (which may also be called Gxx session) to be deleted according to the NAI, the APN or the IP address of the UE, wherein session identifier 1 is saved in the context, and this identifier is allocated by the BBERF during the gateway control session establishment procedure. The BBERF sends a gateway control session termination indication message to the vDRA, and this message may be filled in with a destination address according to the address of the DRA obtained by configuration or the destination domain name according to the domain name of the home network derived from the NAI or the domain name of the visited network, meanwhile, this message carries the session identifier 1.

Step 703: after the vDRA deletes the information of the corresponding gateway control session in the vDRA according to the session identifier 1, the vDRA feeds back an acknowledgement message to the BBERF. Herein, the deletion may be realized in a plurality of modes, for instance, deleting the information of this Gxx session saved in the vDRA, or making a mark in the vDRA to indicate that this Gxx session has been released. The specific deleting mode does not affect the implementation of the present invention. If in the vDRA, all the Diameter sessions of this IP-CAN session have been deleted or all the Diameter sessions of this UE have been deleted, the vDRA deletes all information of this IP-CAN session or of this UE.

Step 704: at the same time of sending the message in the step 702, the BBERF sends the gateway control session termination indication message to the vPCRF, wherein the destination address in this message is an identifier or an IP address of the vPCRF obtained during the gateway control session establishment procedure, and this message carries the session identifier 1.

The Redirect mechanism of the Diameter may also be used by the step 704, wherein after the identifier or the IP address of the vPCRF is obtained from the Redirect message received in the step 703, the gateway control session termination indication message is sent to the vPCRF.

Step 705: the vPCRF finds corresponding context saved by itself according to the session identifier 1 received, wherein the context includes session identifier 2 corresponding to the Diameter session established between the vPCRF and the hPCRF. The vPCRF determines that the realizing mode of the hDRA are the Proxy or transformation thereof according to the action of the hDRA during the gateway control session establishment procedure, and sends a message to the hDRA to notify the hDRA that the Gxx session of the session corresponding to the session identifier 2 is deleted, and the destination domain name this message is filled in with the domain name of the home network derived from the NAI, meanwhile, this message carries the session identifier 2, and further, may also carry the session identifier 1.

Step 706: after the hDRA deletes the information of the corresponding Gxx session in the hDRA according to the session identifier 2 and/or the session identifier 1, the hDRA forwards the message to the hPCRF, wherein the destination address in this message is the identifier or the IP address of the hPCRF obtained during the gateway control session establishment procedure. Herein, the deletion may be realized in a plurality of modes, for instance, deleting the information of this Gxx session saved in the hDRA, or making a mark in the hDRA to indicate that this Gxx session has been released. The specific deleting mode does not affect the implementation of the present invention. If in the hDRA, all the Diameter sessions of this IP-CAN session have been deleted or all the Diameter sessions of this UE have been deleted, the hDRA deletes all information of this IP-CAN session or of this UE.

Step 707: the hPCRF deletes the information related to this Gxx session in the hPCRF according to the session identifier 2 and/or the session identifier 1, and feeds back an acknowledgement message to the vDRA.

Step 708: the hDRA forwards the acknowledgement message to the vPCRF.

Step 709: after the vPCRF receives the acknowledgement message, the vPCRF deletes the information related to this Gxx in the vPCRF, and feeds back a gateway control session termination acknowledgement to the BBERF. If in the vPCRF, all the Diameter sessions of this IP-CAN session have been deleted or all the Diameter sessions of this UE have been deleted, the vPCRF deletes all information of this IP-CAN session or of this UE.

Step 710: after the BBERF receives the acknowledgement message, the BBERF deletes the information related to the Gxx session in the BBERF, and feeds back a delete gateway control session response message.

Embodiment 5

Figure 8:
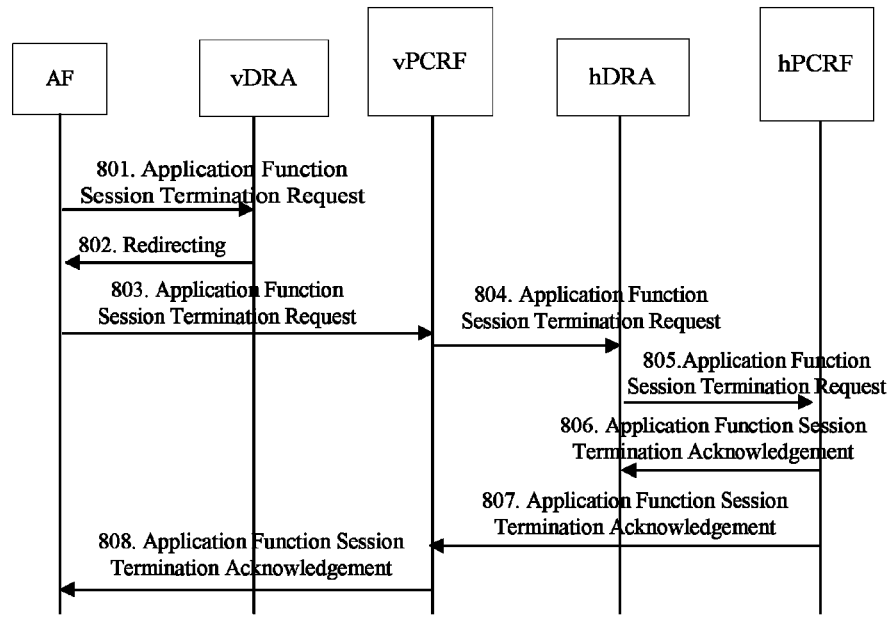
FIG. 8 is a flow chart of the AF session termination when the service is terminated in Method Embodiment 5 of the present invention.

The AF described in the present embodiment is in the visited network (the UE is in the local breakout and the visited network operator providing the IP service), and an AF session termination flow is caused when the service is terminated, wherein the visited DRA is in the Redirect mode, and the home network DRA is in the Proxy mode. FIG. 8 is a flow chart of the AF session termination caused when the service is terminated according to the present embodiment, and as shown in FIG. 8, the following steps (step 801-step 808) are comprised.

Step 801: the AF may learns that the vDRA uses the realizing mode of the Redirect according to configuration information or the action of the vDRA obtained during a gateway control session establishment procedure. The AF sends an AF session termination request message to the vDRA, this message may be filled in with the destination address according to the address of the DRA obtained by configuration or the destination domain name according to the domain name of the home network derived from the NAI or the domain name of the visited network, meanwhile, this message carries session identifier 1, and this identifier 1 is allocated by the AF during an AF session establishment procedure.

Step 802: after the vDRA deletes the information of the corresponding Rx session in the vDRA according to the session identifier 1, the vDRA feeds back an acknowledgement message to the AF. Herein, the deletion may be realized in a plurality of modes, for instance, deleting the information of this Rx session saved in the vDRA, or making a mark in the vDRA to indicate that this Rx session has been released. The specific deleting mode does not affect the implementation of the present invention. If in the vDRA, all the Diameter sessions of this IP-CAN session have been deleted or all the Diameter sessions of this UE have been deleted, the vDRA deletes all information of this IP-CAN session or of UE.

Step 803: at the same time of sending the message in the step 801, the AF sends the AF session termination request message to the vPCRF, wherein the destination address in this message is an identifier or an IP address of the vPCRF obtained during the gateway control session establishment procedure, and this message carries the session identifier 1.

The Redirect mechanism of the Diameter may also be used by the step 803, wherein after the identifier or the IP address of the vPCRF is obtained from the Redirect message received in the step 802, the AF session termination request message is sent to the vPCRF.

Step 804: the vPCRF finds corresponding context according to the session identifier 1 received, wherein the context includes session identifier 2 corresponding to the Diameter session established between the vPCRF and the hPCRF. The vPCRF determines that the realizing mode of the hDRA is the Proxy according to the action of the hDRA during the AF session establishment procedure, and sends the request message to the hDRA to notify the hDRA that the Rx session of the session corresponding to the session identifier 2 is deleted, and the destination domain name filled into this message is the domain name of the home network derived from the NAI, meanwhile, this message also carries the session identifier 2, and further, may also carry the session identifier 1.

Step 805: after the hDRA deletes the information of the corresponding Rx session in the hDRA according to the session identifier 2 and/or the session identifier 1, the hDRA forwards the request message to the hPCRF, wherein the destination address in this message is the identifier or the IP address of the hPCRF obtained during the Rx session establishment procedure. Herein, the deletion may be realized in a plurality of modes, for instance, deleting the information of the Rx session saved in the hDRA, or making a mark in the hDRA to indicate that this Rx session has been released. The specific deleting mode does not affect the implementation of the present invention. If in the hDRA, all the Diameter sessions of this IP-CAN session have been deleted or all the Diameter sessions of this UE have been deleted, the hDRA deletes all information of this IP-CAN session or of UE.

Step 806: the hPCRF deletes the information related to this Rx according to the session identifier 2 and/or the session identifier 1, and feeds back an AF session termination acknowledgement message to the hDRA.

Step 807: the hDRA feeds back the acknowledgement message to the vPCRF.

Step 808: after the vPCRF receives the acknowledgement message, the vPCRF deletes the information related to the Rx session, and feeds back the AF session termination acknowledgement to the AF. If in the vPCRF, all the Diameter sessions of this IP-CAN session have been deleted or all the Diameter sessions of this UE have been deleted, the vPCRF deletes all information of this IP-CAN session or of this UE.

Embodiment 6

Figure 9:
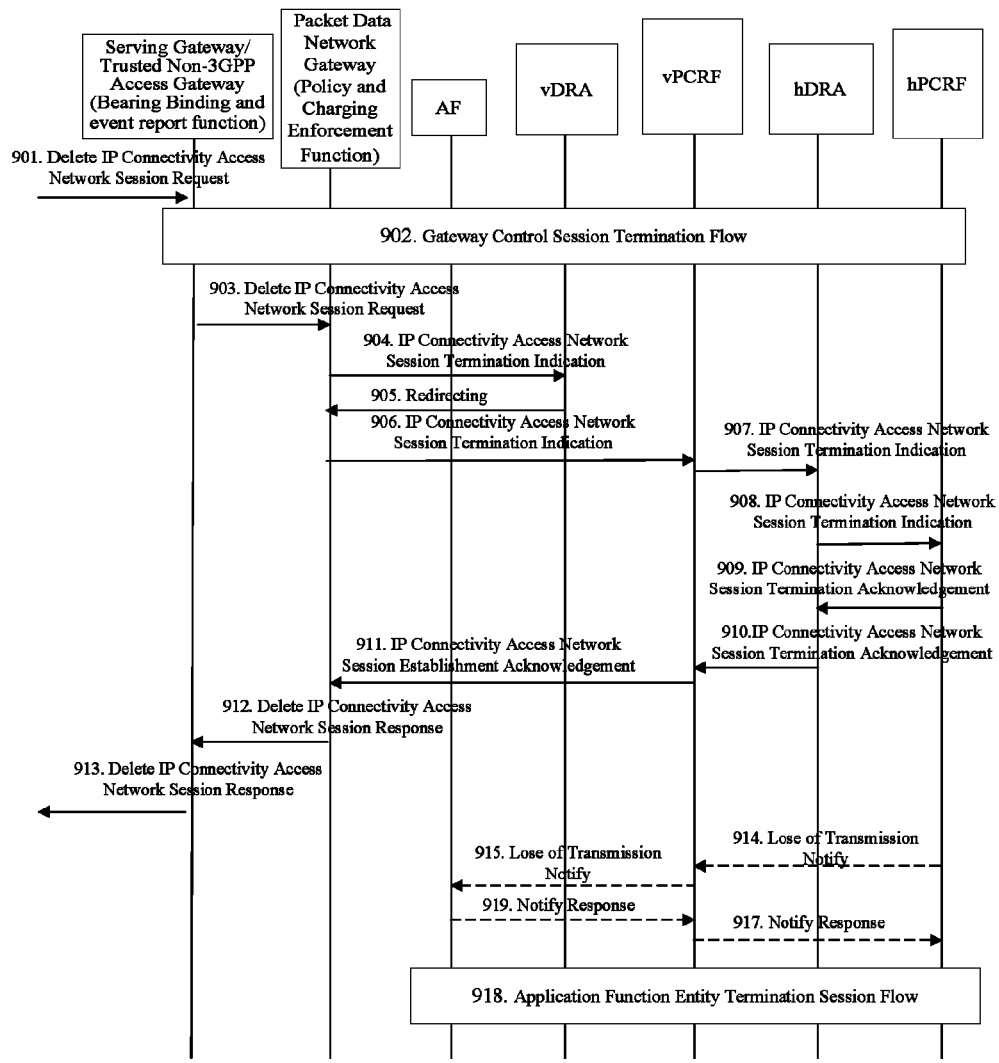
FIG. 9 is a flow chart of the IP-CAN session termination caused by the detachment initiated by the UE in Method Embodiment 6 of the present invention.

In the present embodiment, it is described a flow of the IP-CAN session termination caused by the detachment initiated by a UE after the UE accesses the 3GPP system through the E-UTRAN, the trusted non-3GPP network or the untrusted non-3GPP network, wherein the UE uses the roaming architecture of the local breakout and the visited network operator providing the IP service, wherein the visited DRA is in the Redirect mode, and the home network DRA is in the Proxy mode. FIG. 9 is a flow chart of the IP-CAN session termination caused by the detachment initiated by the UE according to the present embodiment, and as shown in FIG. 9, the following steps (step 901-step 918) are comprised.

Step 901: the BBERF residing in the S-GW or the trusted non-3GPP access gateway receives a delete IP-CAN session request message, wherein the message carries the NAI, the APN and the IP address of the UE.

Step 902: the BBERF initiates the flow of the gateway control session termination, same as in the step 702 of Embodiment 4.

Step 903: the BBERF sends the delete IP-CAN session request message to the PCEF, wherein the message carries the NAI, the APN and the IP address of the UE.

Step 904: the PCEF finds corresponding context according to the NAI, the APN and the IP address of the UE, wherein the context includes session identifier 1 of the Gx session established between the PCEF and the vPCRF. The PCEF may learns that the vDRA uses the realizing mode of the Redirect according to configuration information or the action of the vDRA obtained during an IP-CAN session establishment procedure. The PCEF sends an IP-CAN session termination indication message to the vDRA, and this message may be filled in with the destination address according to the address of the vDRA obtained by configuration or the destination domain name according to the domain name of the home network derived from the NAI or the domain name of the visited network, meanwhile, this message carries the session identifier 1.

Step 905: after the vDRA deletes the information of the corresponding Gx session in the vDRA according to the session identifier 1, the vDRA feeds back an acknowledgement message to the PCEF. Herein, the deletion may be realized in a plurality of modes, for instance, deleting the information of this Gx session saved in the vDRA, or making a mark in the vDRA to indicate that this Gx session has been released. The specific deleting mode does not affect the implementation of the present invention. If in the vDRA, all the Diameter sessions of this IP-CAN session have been deleted or all the Diameter sessions of this UE have been deleted, the vDRA deletes all information of this IP-CAN session or of UE.

Step 906: at the same time of sending the message in the step 904, the PCEF sends an IP-CAN session termination indication message to the vPCRF, wherein the destination address in this message is an identifier or an IP address of the vPCRF obtained during the IP-CAN session establishment procedure, and this message carries the session identifier 1.

The Redirect mechanism of the Diameter may also be used by the step 906, wherein after the identifier or the IP address of the vPCRF is obtained from the Redirect message received in the step 905, the IP-CAN session termination indication message is sent to the vPCRF.

Step 907: the vPCRF finds corresponding context according to the session identifier 1 received, wherein the context includes session identifier 2 corresponding to the Diameter session established between the vPCRF and the hPCRF. The vPCRF may learn that the vDRA uses the realizing mode of the Proxy according to the action of the vDRA obtained during the IP-CAN session establishment procedure. The vPCRF sends a message to the hDRA to notify the hDRA that the Gx session of the corresponding session of the session identifier 2 is deleted, the destination domain name in this message is the domain name of the home network derived from the NAI, this message carries the session identifier 2, and further, may also carry the session identifier 1.

Step 908: after the hDRA deletes the information of the corresponding Gx session in the hDRA according to the session identifier 2 and/or the session identifier 1, the hDRA forwards the message to the hPCRF, wherein the destination address in this message is the identifier or the IP address of the hPCRF obtained during the IP-CAN session establishment procedure. Herein, the deletion may be realized in a plurality of modes, for instance, deleting the information of this Gx session saved in the hDRA, or making a mark in the hDRA to indicate that this Gx session has been released. The specific deleting mode does not affect the implementation of the present invention. If in the hDRA, all the Diameter sessions of this IP-CAN session have been deleted or all the Diameter sessions of this UE have been deleted, the hDRA deletes all information of this IP-CAN session or of UE.

Step 909: the hPCRF deletes the information related to this Gx according to the session identifier 2 and/or the session identifier 1, and feeds back an acknowledgement message to the hDRA.

Step 910: the hDRA forwards the acknowledgement message to the vPCRF.

Step 911: after the vPCRF receives the acknowledgement message, the vPCRF deletes the information related to the Gx session, and feeds back the IP-CAN session termination acknowledgement to the PCEF. If in the vPCRF, all the Diameter sessions of this IP-CAN session have been deleted or all the Diameter sessions of this UE have been deleted, the vPCRF deletes all information of this IP-CAN session or of this UE.

Step 912: the PCEF feeds back a delete IP-CAN session response to the BBERF.

Step 913: the BBERF feeds back the delete IP-CAN session response.

The following steps (step 914-step 918) should also be performed for each of AF sessions related to this IP-CAN session:

Step 914: sending a lose of transmission notify message to the vPCRF by the hPCRF;

Step 915: sending the lose of transmission notify message to the AF by the vPCRF;

Step 916: feeding back a notify response message to the vPCRF by the AF;

Step 917: feeding back the notify response message to the hPCRF by the vPCRF; and Step 918: initiating the AF session termination flow by the AF, same as in the step 808 of Embodiment 5.

Embodiment 7

Figure 10:
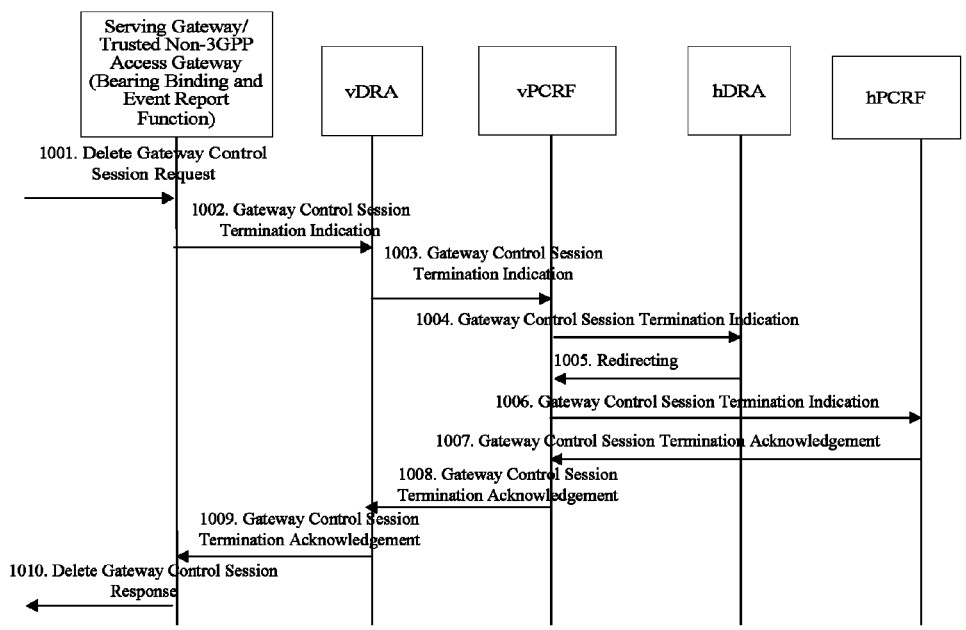
FIG. 10 is a flow chart of the gateway control session termination in Method Embodiment 7 of the present invention.

The present embodiment is the gateway control session termination flow result in the IP-CAN session termination when the UE detaches or the BBERF relocation and the BBERF described in the present embodiment is in the visited network (the UE is in the home routed case or the local breakout case), wherein the visited DRA is the Proxy, and the home network DRA is in the Redirect mode. FIG. 10 is a flow chart of the gateway control session termination according to the present embodiment, and as shown in FIG. 10, the following steps (step 1001-step 1010) are comprised.

Step 1001: the BBERF residing in the S-GW or the trusted non-3GPP access gateway receives a delete gateway control session request message, wherein the message carries the NAI, the APN and the IP address of the UE.

Step 1002: the BBERF may learn that the vDRA uses the realizing mode of the Proxy according to configuration information or the action of the vDRA obtained during a gateway control session establishment procedure. The BBERF searches for the context of the Gxx session to be deleted according to the NAI, the APN or the IP address of the UE, wherein session identifier 1 is saved in the context, the BBERF sends a gateway control session termination indication message to the vDRA, and this message may be filled in with a destination address according to the address of the DRA obtained by configuration or the destination domain name according to the domain name of the home network derived from the NAI or the domain name of the visited network, meanwhile, this message carries the session identifier 1.

Step 1003: after the vDRA obtains the information of the corresponding Gxx session in the vDRA and the vPCRF allocated according to the session identifier 1, the vDRA forwards the gateway control session termination indication message to the vPCRF.

Step 1004: the vPCRF finds corresponding context according to the session identifier 1 received, wherein the context includes session identifier 2 corresponding to the Diameter session established between the vPCRF and the hPCRF. The vPCRF determines that the realizing mode of the hDRA is the Redirect according to the action of the hDRA during the gateway control session establishment procedure, and sends a message to the hDRA to notify the hDRA that the Gxx session of the session corresponding to the session identifier 2 is deleted, the destination domain name filled into this message is the domain name of the home network derived from the NAI, meanwhile, this message carries the session identifier 2, and further, may also carry the session identifier 1.

Step 1005: after the hDRA deletes the information of the corresponding Gxx session in the hDRA according to the session identifier 2 and/or the session identifier 1, the hDRA feeds back an acknowledgement message to the vPCRF. Herein, the deletion may be realized in a plurality of modes, for instance, deleting the information of this Gxx session saved in the hDRA, or making a mark in the hDRA to indicate that this Gxx session has been released. The specific deleting mode does not affect the implementation of the present invention. If in the hDRA, all the Diameter sessions of this IP-CAN session have been deleted or all the Diameter sessions of this UE have been deleted, the hDRA deletes all information of this IP-CAN session or of UE.

Step 1006: at the same time of sending the message in the step 1004, the vPCRF sends the message to the hPCRF, wherein the destination address in this message is the identifier or the IP address of the hPCRF obtained during the gateway control session establishment procedure, this message carries the session identifier 2, and further, may also carry the session identifier 1.

Step 1007: the hPCRF deletes the information related to this Gxx in the hPCRF according to the session identifier 2 and/or the session identifier 1, and feeds back an acknowledgement message to the vPCRF.

The Redirect mechanism of the Diameter may also be used by the step 1007, wherein after the identifier or the IP address of the hPCRF is obtained from the Redirect message received in the step 1005, the message is sent to the hPCRF.

Step 1008: after the vPCRF receives the acknowledgement message, the vPCRF deletes the information related to this Gxx session in the vPCRF, and feeds back a gateway control session termination acknowledgement to the vDRA. If in the vPCRF, all the Diameter sessions of this IP-CAN session have been deleted or all the Diameter sessions of this UE have been deleted, the vPCRF deletes all information of this IP-CAN session or of this UE.

Step 1009: after the vDRA receives the acknowledgement message, the vDRA deletes the related information, and feeds back the acknowledgement message to the BBERF. Herein, the deletion may be realized in a plurality of modes, for instance, deleting the information of this Gxx session saved in the vDRA, or making a mark in the vDRA to indicate that this Gxx session has been released. The specific deleting mode does not affect the implementation of the present invention. If in the vDRA, all the Diameter sessions of this IP-CAN session have been deleted or all the Diameter sessions of this UE have been deleted, the vDRA deletes all information of this IP-CAN session or of UE.

Step 1010: after the BBERF receives the acknowledgement message, the BBERF deletes the information related to the Gxx session in the BBERF, and feeds back a delete gateway control session response message.

Embodiment 8

Figure 11:
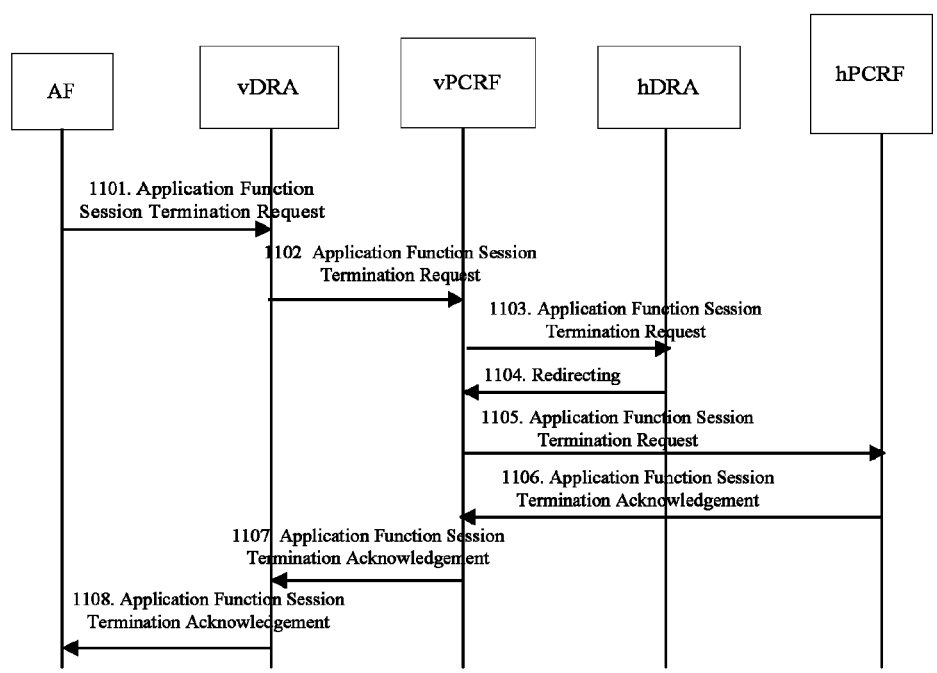
FIG. 11 is a flow chart of the AF session termination caused when the service is terminated in Method Embodiment 8 of the present invention.

The AF described in the present embodiment is in the visited network (the UE is in the local breakout and the visited network operator providing the IP service), and the AF session termination flow is caused when the service is terminated, wherein the visited DRA is the Proxy, and the home network DRA is in the Redirect mode. FIG. 11 is a flow chart of the AF session termination caused when the service is terminated according to the present embodiment, and as shown in FIG. 11, the following steps (step 1101-step 1108) are comprised.

Step 1101: the AF may learn that the vDRA uses the realizing mode of the Proxy according to configuration information or the action of the vDRA obtained during a gateway control session establishment procedure. The AF sends an AF session termination request message to the vDRA, and this message may be filled with the destination address according to the address of the DRA obtained by configuration or the destination domain name according to the domain name of the home network derived from the NAI or the domain name of the visited network, meanwhile, this message carries session identifier 1, and this identifier is allocated by the AF during an AF session establishment procedure.

Step 1102: the vDRA finds corresponding context and the allocated vPCRF address according to the session identifier 1, and sends the AF session termination request message to the vPCRF.

Step 1103: the vPCRF finds corresponding context according to the session identifier 1 received, wherein the context includes session identifier 2 corresponding to the Diameter session established between the vPCRF and the hPCRF. The vPCRF determines that the realizing mode of the hDRA is the Redirect according to the action of the hDRA during the AF session establishment procedure, and sends a request message to the hDRA to notify the hDRA that the Rx session of the session corresponding to the session identifier 2 is deleted. The destination domain name in the message is filled in with the domain name of the home network derived from the NAI, meanwhile, this message carries the session identifier 2, and further, may also carry the session identifier 1.

Step 1104: after the hDRA deletes the information of the corresponding Rx session in the hDRA according to the session identifier 2 and/or the session identifier 1, the hDRA feeds back an acknowledgement message to the vPCRF. Herein, the deletion may be realized in a plurality of modes, for instance, deleting the information of this Rx session saved in the hDRA, or making a mark in the hDRA to indicate that this Rx session has been released. The specific deleting mode does not affect the implementation of the present invention. If in the hDRA, all the Diameter sessions of this IP-CAN session have been deleted or all the Diameter sessions of this UE have been deleted, the hDRA deletes all information of this IP-CAN session or of UE.

Step 1105: at the same time of sending the message in the step 1103, the vPCRF sends the request message to the hPCRF, wherein the destination address in this message is an identifier or an IP address of the hPCRF obtained during the AF session establishment procedure, and this message carries the session identifier 2, and further, may also carry the session identifier 1.

Step 1106: the hPCRF deletes the information related to this Rx according to the session identifier 2 and/or the session identifier 1, and feeds back the acknowledgement message to the vPCRF.

The Redirect mechanism of the Diameter may also be used by the step 1105, wherein after the identifier or the IP address of the hPCRF is obtained from the Redirect message received in the step 1104, the message is sent to the hPCRF.

Step 1107: after the vPCRF receives the acknowledgement message, the vPCRF deletes the information related to the Rx session, and feeds back an AF session termination acknowledgement to the vDRA. If in the vPCRF, all the Diameter sessions of this IP-CAN session have been deleted or all the Diameter sessions of this UE have been deleted, the vPCRF deletes all information of this IP-CAN session or of this UE.

Step 1108: after the vDRA receives the acknowledgement message, the vDRA deletes the information related to the Rx session, and feeds back the AF session termination acknowledgement to the AF. Herein, the deletion may be realized in a plurality of modes, for instance, deleting the information of this Rx session saved in the vDRA, or making a mark in the vDRA to indicate that this Rx session has been released. The specific deleting mode does not affect the implementation of the present invention. If in the vDRA, all the Diameter sessions of this IP-CAN session have been deleted or all the Diameter sessions of this UE have been deleted, the vDRA deletes all information of this IP-CAN session or of UE.

Embodiment 9

In the present embodiment, it is described a flow of the IP-CAN session termination caused by the detachment initiated by a UE after the UE accesses the 3GPP system from the E-UTRAN, the trusted non-3GPP network or the untrusted non-3GPP network, wherein the UE uses the roaming architecture of the local breakout and the visited network operator providing the IP service, wherein the visited DRA is the Proxy, and the home network DRA is in the Redirect mode.

Figure 12:
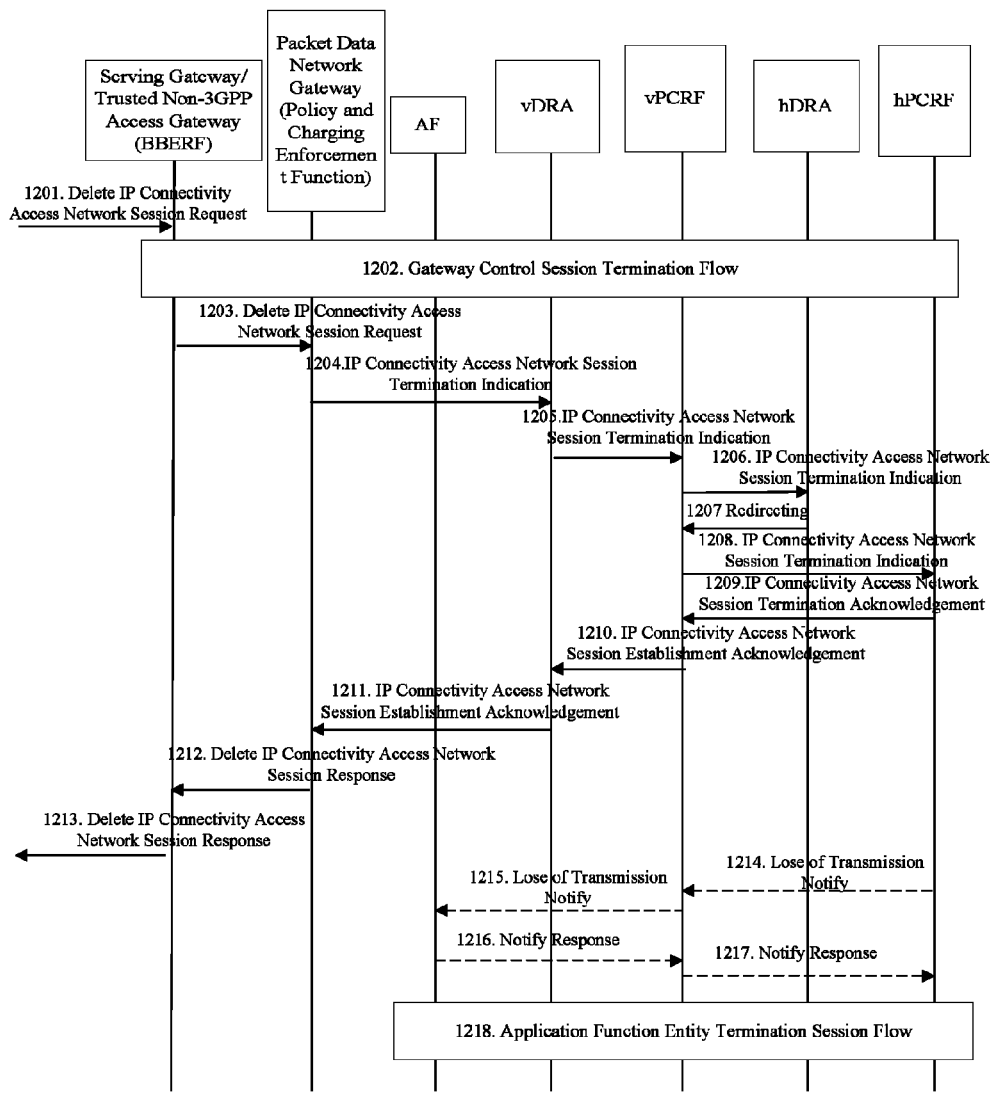
FIG. 12 is a flow chart of the IP-CAN session termination caused by the detachment initiated by the UE in Method Embodiment 9 of the present invention.

FIG. 12 is a flow chart of the IP-CAN session termination caused by the detachment initiated by the UE according to the present embodiment, and as shown in FIG. 12, the following steps (step 1201-step 1218) are comprised.

Step 1201: the BBERF residing in the S-GW or the trusted non-3GPP access gateway receives a delete IP-CAN session request message, wherein the message carries the NAI, the APN and the IP address of the UE.

Step 1202: the BBERF initiates the flow of the gateway control session termination, same as in the step 1102 of Embodiment 8.

Step 1203: the BBERF sends the delete IP-CAN session request to the PCEF, wherein the message carries the NAI, the APN and the IP address of the UE.

Step 1204: the PCEF finds corresponding context according to the NAI, the APN and the IP address of the UE, wherein the context includes session identifier 1 of the Gx session established between the PCEF and the vPCRF. The PCEF may learn that the vDRA uses the realizing mode of the Proxy according to configuration information or the action of the vDRA obtained during an IP-CAN session establishment procedure. The PCEF sends an IP-CAN session termination indication message to the vDRA, and this message may be filled in with the destination address according to the address of the vDRA obtained by configuration or the destination domain name according to the domain name of the home network derived from the NAI or the domain name of the visited network, meanwhile, this message carries the session identifier 1.

Step 1205: the vDRA finds the vPCRF allocated by the corresponding context according to the session identifier 1, and the vDRA forwards the IP-CAN session termination indication message to the vPCRF, wherein the message carries the session identifier 1.

Step 1206: the vPCRF finds corresponding context according to the session identifier 1 received, wherein the context includes session identifier 2 corresponding to the Diameter session established between the vPCRF and the hPCRF. The vPCRF may learn that the vDRA uses the realizing mode of the Redirect according to the action of the vDRA obtained during the IP-CAN session establishment procedure. The vPCRF sends a message to the hDRA to notify the hDRA that the Gx session of the corresponding session of the session identifier 2 is deleted, the destination domain name in this message is the domain name of the home network derived from the NAI, and this message carries the session identifier 2, and further, may also carry the session identifier 1.

Step 1207: after the hDRA deletes the information of the corresponding Gx session in the hDRA according to the session identifier 2 and/or the session identifier 1, the hDRA feeds back an acknowledgement message to the vPCRF. Herein, the deletion may be realized in a plurality of modes, for instance, deleting the information of this Gx session saved in the hDRA, or making a mark in the hDRA to indicate that this Gx session has been released. The specific deleting mode does not affect the implementation of the present invention. If in the hDRA, all the Diameter sessions of this IP-CAN session have been deleted or all the Diameter sessions of this UE have been deleted, the hDRA deletes all information of this IP-CAN session or of the UE;

Step 1208: at the same time of sending the message in the step 1206, the vPCEF sends the IP-CAN session termination indication message to the hPCRF, wherein the destination address in this message is the identifier or the IP address of the hPCRF obtained during the IP-CAN session establishment procedure, and this message carries the session identifier 2, and further, may also carry the session identifier 1.

Step 1209: the hPCRF deletes the information related to this Gx according to the session identifier 2 and/or the session identifier 1, and feeds back the acknowledgement message to the vPCRF.

The Redirect mechanism of the Diameter may also be used by the step 1208, wherein after the identifier or the IP address of the hPCRF is obtained from the Redirect message received in the step 1208, the message is sent to the hPCRF.

Step 1210: after the vPCRF receives the acknowledgement message, the vPCRF deletes the information related to the Gx session, and feeds back the IP-CAN session termination acknowledgement to the vDRA. If in the vPCRF, all the Diameter sessions of this IP-CAN session have been deleted or all the Diameter sessions of this UE have been deleted, the vPCRF deletes all information of this IP-CAN session or of this UE.

Step 1211: the vDRA receives the acknowledgement message, deletes the information related to the Gx session, and feeds back the acknowledgement message to the PCEF. Herein, the deletion may be realized in a plurality of modes, for instance, deleting the information of this Gx session saved in the vDRA, or making a mark in the vDRA to indicate that this Gx session has been released. The specific deleting mode does not affect the implementation of the present invention. If in the vDRA, all the Diameter sessions of this IP-CAN session have been deleted or all the Diameter sessions of this UE have been deleted, the vDRA deletes all information of this IP-CAN session or of the UE.

Step 1212: the PCEF feeds back a delete IP-CAN session response to the BBERF.

Step 1213: the BBERF feeds back the delete IP-CAN session response.

The following steps (step 1214-step 1218) should also be performed for each of the AF session related to this IP-CAN session:

Step 1214: sending a lose of transmission notify message to the vPCRF by the hPCRF;

Step 1215: sending the lose of transmission notify message to the AF by the vPCRF;

Step 1216: feeding back a notify response message to the vPCRF by the AF;

Step 1217: feeding back the notify response message to the hPCRF by the vPCRF; and Step 1218: initiating the AF session termination flow by the AF, same as in the step 808 of Embodiment 5.

Example 10

Figure 13:
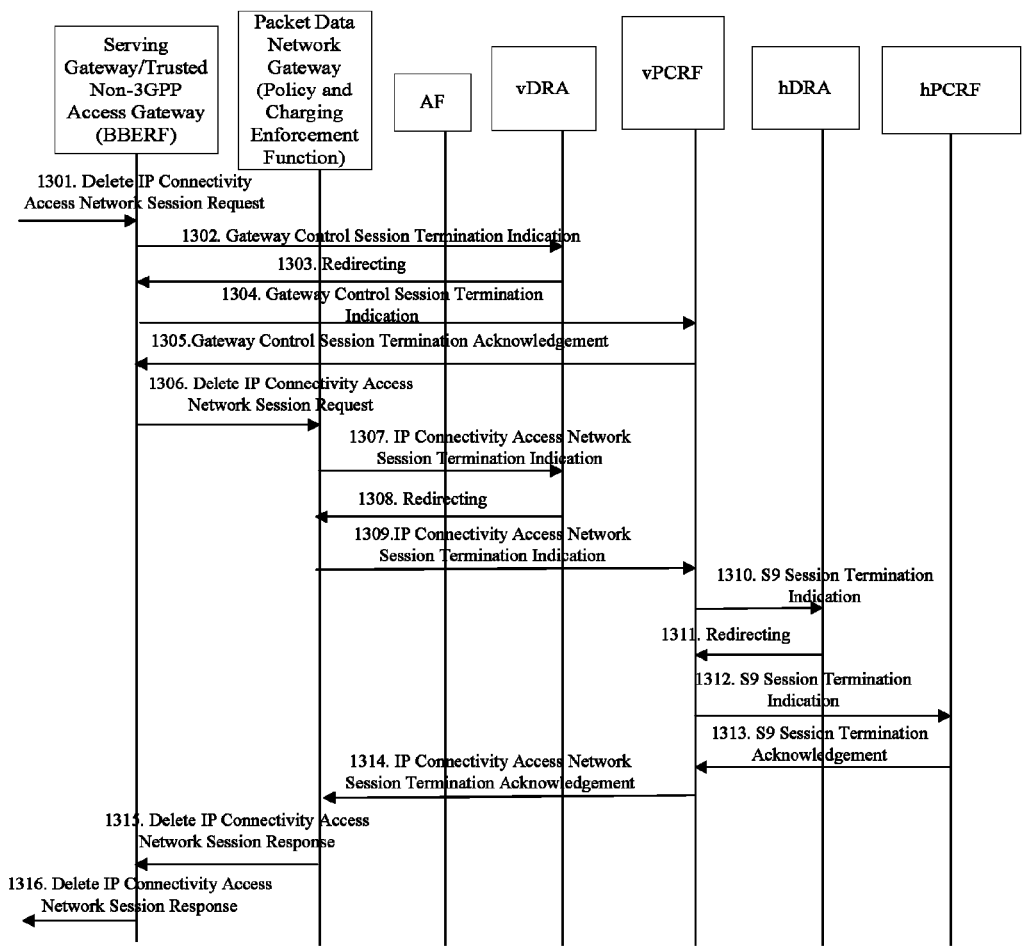
FIG. 13 is a flow chart of the IP-CAN session termination caused by the detachment initiated by the UE in Method Embodiment 10 of the present invention.

In the present embodiment, it is described a flow of the IP-CAN session termination caused by the detachment initiated by a UE after the UE accesses the 3GPP system through the E-UTRAN, the trusted non-3GPP network or the untrusted non-3GPP network, wherein the UE uses the roaming architecture of the local breakout and the visited network operator providing the IP service, wherein the visited DRA is the Redirect, and the home network DRA is in the Redirect mode. Moreover, one Diameter session (i.e., an S9 session) is used between the vPCRF and the hPCRF to transmit all the Gxx session information, Gx of all the IP-CAN sessions of the UE or Gxx sessions hidden by the vPCRF, and the S9 session transmits all the Gx sessions of all the IP-CAN sessions of the UE. FIG. 13 is a flow chart of the IP-CAN session termination caused by the detachment initiated by the UE according to the present embodiment, and as shown in FIG. 13, the following steps (step 1301-step 1316) are comprised.

Step 1301: the BBERF residing in the S-GW or the trusted non-3GPP access gateway receives a delete gateway control session request message, wherein the message carries the NAI, the APN and the IP address of the UE.

Step 1302: the BBERF may learn that the vDRA uses the realizing mode of the Redirect according to configuration information or the action of the vDRA obtained during a gateway control session establishment procedure. The BBERF obtains the context of the gateway control session (which may also be called Gxx session) to be deleted according to the NAI, the APN or the IP address of the UE, wherein session identifier 1 is saved in the context, this identifier 1 is allocated by the BBERF for this Gxx session during the gateway control session establishment procedure, the base protocol of the Diameter ensures the session identifier 1 to be globally unique. The BBERF sends a gateway control session termination indication message to the vDRA, and this message is filled in with the destination address according to the address of the DRA obtained by configuration or the destination domain name according to domain name of the home network derived from the NAI or the domain name of the visited network, meanwhile, this message carries the session identifier 1.

Step 1303: after the vDRA deletes the information of the corresponding Gxx session in the vDRA according to the session identifier 1, the vDRA feeds back an acknowledgement message to the BBERF. Herein, the deletion may be realized in a plurality of modes, for instance, deleting the information of this Gxx session saved in the vDRA, or making a mark in the vDRA to indicate that this Gxx session has been released. The specific deleting mode does not affect the implementation of the present invention. If in the vDRA, all the Diameter sessions of this IP-CAN session have been deleted or all the Diameter sessions of this UE have been deleted, the vDRA deletes all information of this IP-CAN session or of this UE.

Step 1304: at the time of sending the gateway control session termination indication message in the step 1302, the BBERF sends the gateway control session termination indication message to the vPCRF, wherein the destination address in this message is an identity or an IP address of the vPCRF obtained during the gateway control session establishment procedure, and this message carries the session identifier 1.

The Redirect mechanism of the Diameter may also be used by the step 1304, where after the identifier or the IP address of the vPCRF is obtained from the Redirect message received in the step 1303, the gateway control session termination indication message is sent to the vPCRF.

Step 1305: the vPCRF finds corresponding context saved by itself according to the session identifier 1 received, wherein the context includes session identifier 2 corresponding to the Diameter session (S9 session) established between the vPCRF and the hPCRF. Since this Gxx session is hidden or the Gxx and the Gx sessions are combined into one S9 session, the vPCRF determines that this Gxx session is not the last Diameter session corresponding to the S9 session, thus, the vPCRF does not send an S9 session termination message to the hDRA for the moment. The vPCRF makes a mark indicating that this Gxx session has been deleted (or deletes the information related to this Gxx session in the vPCRF), and feeds back a gateway control session termination acknowledgement to the BBERF. After the BBERF receives the acknowledgement message, the BBERF deletes the information related to the Gxx session in the BBERF, and feeds back a gateway control session response message. If the Gxx is not hidden, before the vPCRF feeds back the acknowledgement message to the BBERF, the vPCRF may send an S9 session modify message to the hPCRF to request the hPCRF to delete the Gxx session, and the hPCRF makes a mark indicating that this Gxx session has-been-deleted (or deletes the information related to this Gxx session in the vPCRF), and feeds back the acknowledgement message.

Step 1306: the BBERF sends the delete IP-CAN session request to the PCEF, wherein the message carries the NAI, the APN and the IP address of the UE.

Step 1307: the PCEF finds corresponding context saved by itself according to the NAI, the APN and the IP address of the UE, wherein the context includes session identifier 3 of the Diameter session established between the PCEF and the vPCRF. This Diameter session may also be called Gx session. The PCEF may learns that the vDRA uses the realizing mode of the Redirect according to configuration information or the action of the vDRA obtained during the IP-CAN session establishment procedure. The PCEF sends the IP-CAN session termination indication message to the vDRA, and this message may be filled in with the destination address according to the address of the vDRA obtained by configuration or the destination domain name according to the domain name of the home network derived from the NAI or the domain name of the visited network, meanwhile, this message carries the session identifier 3.

Step 1308: after the vDRA deletes the information of the corresponding Gx session in the vDRA according to the session identifier 3, the vDRA feeds back an acknowledgement message to the PCEF. Herein, the deletion may be realized in a plurality of modes, for instance, deleting the information of this Gx session saved in the vDRA, or making a mark in the vDRA to indicate that this Gx session has been released. The specific deleting mode does not affect the implementation of the present invention. If in the vDRA, all the Diameter sessions of this IP-CAN session or all the Diameter sessions of this UE have been deleted, the vDRA deletes all information of this IP-CAN session or of the UE.

Step 1309: at the same time of sending the message in the step 1307, the PCEF sends the IP-CAN session termination indication message to the vPCRF, wherein the destination address in this message is the identifier or the IP address of the vPCRF obtained during the IP-CAN session establishment procedure, and this message carries the session identifier 3.

The Redirect mechanism of the Diameter may also be used by the step 1309, wherein after the identifier or the IP address of the vPCRF is obtained from the Redirect message received in the step 1308, the IP-CAN session termination indication message is sent to the vPCRF.

Step 1310: the vPCRF finds corresponding context saved by itself according to the session identifier 3 received, wherein the context includes session identifier 2 corresponding to the S9 session established between the vPCRF and the hPCRF, and the Gxx session associated with the S9 session has been terminated in the step 1305. At this moment, this IP-CAN session associated with the S9 session or all the Gxx and Gx sessions of the UE have been terminated, and the vPCRF decides to terminate the S9 session. The vPCRF may learn that the vDRA uses the realizing mode of the Redirect according to the action of the vDRA obtained during the IP-CAN session establishment procedure. The vPCRF sends a message to the hDRA to notify the hDRA that the S9 session of the corresponding session of the session identifier 2 is deleted, and the destination domain name in this message is the domain name of the home network derived from the NAI, moreover, this message carries the session identifier 2, and further, may also carry the session identifiers 1 and/or 3.

Step 1311: after the hDRA deletes the information of the corresponding S9 session in the hDRA according to the session identifier 2 and/or 1 and the session identifier 3, the hDRA feeds back the acknowledgement message to the vPCRF. Herein, the deletion may be realized in a plurality of modes, for instance, deleting the information of this S9 session saved in the hDRA, or making a mark in the hDRA to indicate that this S9 session has been released. The specific deleting mode does not affect the implementation of the present invention. If in the hDRA, all the Diameter sessions of this IP-CAN session or of the UE have been deleted, the hDRA deletes all information of this IP-CAN session or of the UE.

Step 1312: at the same time of sending the message in the step 1310, the vPCRF sends the IP-CAN session termination indication message to the hPCRF, wherein the destination address in this message is the identifier or the IP address of the hPCRF obtained during the S9 session establishment procedure, and this message carries the session identifier 2, and further, may also carry the session identifiers 1 and/or 3.

Step 1313: the hPCRF deletes the information related to this S9 according to the session identifier 2 and/or the session identifier 1, and feeds back an S9 session termination acknowledgement message to the vPCRF.

The Redirect mechanism of the Diameter may also be used by the step 1312, wherein after the identifier or the IP address of the hPCRF is obtained from the Redirect message received in the step 1311, the S9 session termination indication message is sent to the hPCRF.

Step 1314: after the vPCRF receives the acknowledgement message, the vPCRF deletes the information related to the S9, and feeds back the IP-CAN session termination acknowledgement to the PCEF. If in the vPCRF, all the Diameter sessions of this IP-CAN session have been deleted or all the Diameter sessions of this UE have been deleted, the vPCRF deletes all information of this IP-CAN session or of this UE.

Step 1315: the PCEF feeds back a response message to the BBERF.

Step 1316: the PCEF feeds back the response message.

The difference between Embodiment 10 and Embodiments 1-9 lies in: when the vPCRF receives the delete Diameter session request message sent by a visited client, and when the Diameter session to be deleted is the last Diameter session associated with the S9 session between the vPCRF and hPCRF, the vPCRF sends the delete Diameter session request message to the hDRA and the hPCRF.

For the vDRA using the Redirect mode and the hDRA using the Proxy mode, and the vDRA using the Proxy mode and the hDRA using the Redirect mode, when the vPCRF sends the delete Diameter session request message to the hDRA and the hPCRF, the determining procedure similar to that in Embodiment 10 may be performed, and the remaining flow may be performed with reference to Embodiment 6 and Embodiment 9, respectively.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for deleting session information in DRA, adapted to an Evolved Packet System under a roaming scene, the method comprising:
   sending a request message for deleting a Diameter session to a visited Diameter Routing Agent DRA and a visited Policy and Charging Rules Function PCRF by a policy and charging control client;

marking the Diameter session in the visited DRA as termination by the visited DRA after the visited DRA receives the request message; and sending a message to a home DRA by the visited PCRF, after the visited PCRF receives the request message, to request to delete information of the Diameter session, and marking the Diameter session in the home DRA as termination by the home DRA.

2. The method according to claim 1, wherein the request message sent by the policy and charging control client carries a first session identifier allocated by the policy and charging control client during a session establishment procedure.

3. The method according to claim 2, wherein
marking the Diameter session in the visited DRA as termination comprises:
marking the Diameter session in the visited DRA as termination by the visited DRA according to the first session identifier.

4. The method according to claim 3, wherein the policy and charging control client comprises one of a Bearer Binding and Event Report Function entity BBERF, a Policy and charging enforcement function entity PCEF and an Application Function entity AF.

5. The method according to claim 4 when the policy and charging control client is the BBERF, wherein the request message is a gateway control session termination indication message, and the Diameter session is a Gxx session.

6. The method according to claim 4 when the policy and charging control client is the AF, wherein the request message is an AF session termination request message, and the Diameter session is an Rx session.

7. The method according to claim 4 when the policy and charging control client is the PCEF, wherein the request message is an IP Connectivity Access Network, i.e. IP-CAN, session termination indication message, and the Diameter session is a Gx session.

8. The method according to claim 7, wherein
after the visited DRA or home DRA deletes the information of the Diameter session, if all Diameter sessions belonging to an IP-CAN session or all Diameter sessions belonging to a UE in the visited DRA or the home DRA are deleted, the visited DRA or the home DRA deletes all information of the IP-CAN session or of the UE.

9. The method according to claim 2, wherein sending the message to the home DRA comprises:
obtaining a second session identifier corresponding to a Diameter session established between the visited PCRF and a home PCRF by the visited PCRF according to the first session identifier, sending the message carrying the second session identifier to the home DRA by the visited PCRF; marking the Diameter session in the home DRA as termination by the home DRA according to the second session identifier; or
sending the message carrying the first session identifier and the second session identifier to the home DRA by the visited PCRF; marking the Diameter session in the home DRA as termination by the home DRA according to the first session identifier and the second session identifier.

10. The method according to claim 9, wherein both the visited DRA and the home DRA are in a Redirect mode, wherein
sending the request message by the policy and charging control client comprises: sending the request message to the visited DRA by the policy and charging control client, marking the Diameter session in the visited DRA as termination and returning a Redirect message to the policy and charging control client by the visited DRA; obtaining a visited PCRF identifier or address information according to the Redirect message and sending the request message to the visited PCRF by the policy and charging control client, and sending the message by the visited PCRF comprises: sending the message to the home DRA by the visited PCRF, returning the Redirect message to the visited PCRF by the home DRA after the home DRA marks the Diameter session in the home DRA as termination; or sending the request message by the policy and charging control client comprises: sending the request message for deleting the Diameter session to the visited DRA and the visited PCRF simultaneously by the policy and charging control client; returning an acknowledgement message to the policy and charging control client by the visited DRA after the visited DRA marks the Diameter session in the visited DRA as termination, and sending the message by the visited PCRF comprises: sending the request message for deleting the Diameter session to the home DRA and the home PCRF simultaneously by the visited PCRF; returning the acknowledgement message to the visited PCRF by the home DRA after the home DRA marks the Diameter session in the home DRA as termination.

11. The method according to claim 9, wherein the visited DRA is in a Redirect mode, and the home DRA is in a Proxy mode, wherein
sending the request message by the policy and charging control client comprises: sending the request message to the visited DRA by the policy and charging control client, returning a Redirect message to the policy and charging control client by the visited DRA after the visited DRA marks the Diameter session as termination; obtaining a visited PCRF identifier or address information according to the Redirect message and sending the request message to the visited PCRF by the policy and charging control client, and sending the message by the visited PCRF comprises: sending the message to the home DRA by the visited PCRF, and forwarding the message to the home PCRF by the home DRA; or
sending the request message by the policy and charging control client comprises: sending the request message to the visited DRA and the visited PCRF simultaneously by the policy and charging control client; returning the acknowledgement message to the policy and charging control client by the visited DRA after the visited DRA marks the Diameter session as termination, and sending the message by the visited PCRF comprises: sending the message to the home DRA by the visited PCRF, and forwarding the message to the home PCRF by the home DRA.

12. The method according to claim 9, wherein the visited DRA is in a Proxy mode and the home DRA is in a Redirect mode, with the method further comprising:
sending the request message by the policy and charging control client comprises: sending the request message to the visited DRA by the policy and charging control client, forwarding the request message to the visited PCRF by the visited DRA; and sending the message by the visited PCRF comprises: sending the message to the home DRA by the visited PCRF, returning a Redirect message to the visited PCRF by the home DRA after the home DRA marks the Diameter session in the home DRA as termination; or sending the request message by the policy and charging control client comprises:

sending the request message to the visited DRA by the policy and charging control client, forwarding the request message to the visited PCRF by the visited DRA, and sending the message by the visited PCRF comprises: sending the message to the home DRA and the home PCRF simultaneously by the visited PCRF, returning an acknowledgement message to the visited PCRF by the home DRA after the home DRA marks the Diameter session in the home DRA as termination.

13. The method according to claim 1, wherein the policy and charging control client comprises one of a Bearing Binding and Event Report Function entity BBERF, a Policy and charging enforcement function entity PCEF and an Application Function entity AF.

14. The method according to claim 13 when the policy and charging control client is the BBERF, wherein the request message is a gateway control session termination indication message, and the Diameter session is a Gxx session.

15. The method according to claim 13 when the policy and charging control client is the AF, wherein the request message is an AF session termination request message, and the Diameter session is an Rx session.

16. The method according to claim 13 when the policy and charging control client is the PCEF, wherein the request message is an IP Connectivity Access Network, i.e. IP-CAN, session termination indication message, and the Diameter session is a Gx session.

17. The method according to claim 16, wherein after the visited DRA or home DRA deletes the information of the Diameter session, if all Diameter sessions belonging to an IP-CAN session or all Diameter sessions belonging to a UE in the visited DRA or the home DRA are deleted, the visited DRA or the home DRA deletes all information of the IP-CAN session or of the UE.

18. The method according to claim 1, wherein sending the message to the home DRA comprises:

sending the message to the home DRA by the visited PCRF, after the visited PCRF receives the request message, when the Diameter session to be deleted is determined to be a last Diameter session corresponding to an S9 session between the visited PCRF and home PCRF.

* * * * *